(12) United States Patent
Asakura et al.

(10) Patent No.: US 10,336,341 B2
(45) Date of Patent: Jul. 2, 2019

(54) VEHICLE CONTROL SYSTEM, TRAFFIC CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Wako (JP); Kunimichi Hatano, Wako (JP); Naoto Sen, Wako (JP); Masaaki Abe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 45 days.

(21) Appl. No.: 15/497,850

(22) Filed: Apr. 26, 2017

(65) Prior Publication Data
US 2017/0313320 A1    Nov. 2, 2017

(30) Foreign Application Priority Data
Apr. 28, 2016  (JP) ................................. 2016-090689

(51) Int. Cl.
*B60W 40/08* (2012.01)
*B60W 10/04* (2006.01)
(Continued)

(52) U.S. Cl.
CPC ......... *B60W 40/08* (2013.01); *B60R 25/1012* (2013.01); *B60W 10/04* (2013.01);
(Continued)

(58) Field of Classification Search
CPC ..... B60W 40/08; B60W 10/04; G05D 1/0088
(Continued)

(56) References Cited

U.S. PATENT DOCUMENTS

| | | | |
|---|---|---|---|
| 9,235,211 B2* | 1/2016 | Davidsson | B60W 50/14 |
| 2013/0311001 A1* | 11/2013 | Hampiholi | B60R 25/25 |
| | | | 701/1 |
| 2015/0149018 A1* | 5/2015 | Attard | G05D 1/0061 |
| | | | 701/23 |

FOREIGN PATENT DOCUMENTS

| | | |
|---|---|---|
| JP | 2011-156967 A | 8/2011 |
| JP | 2013-220804 A | 10/2013 |

(Continued)

OTHER PUBLICATIONS

Office Action dated Jan. 23, 2018, issued in counterpart Japanese Application No. 2016-090689, with English machine translation. (6 pages).

(Continued)

*Primary Examiner* — Isaac G Smith
(74) *Attorney, Agent, or Firm* — Westerman, Hattori, Daniels & Adrian, LLP

(57) ABSTRACT

A vehicle control-system includes an automated driving controller and a vehicle-side communication section. The automated driving controller executes automated driving in which at least one out of speed control or steering control of a vehicle is performed automatically, and executes automated driving in a mode from out of plural modes with differing degrees of automated driving. The vehicle-side communication section communicates with a server for managing characteristic information of a vehicle occupant. The automated driving controller controls automated driving based on the characteristic information of the vehicle occupant received from a server-side communication section using the vehicle-side communication section.

12 Claims, 16 Drawing Sheets

332A

SELF-DRIVING EXECUTION PARAMETERS

| USER ID | SERVER-SIDE AUTHENTICATION INFORMATION | PROFICIENCY LEVEL | PERMITTED SELF-DRIVING MODES |
|---|---|---|---|
| aa | DRIVING LICENSE INFORMATION | HIGH | MODES A to C |
| bb | SOCIAL SECURITY AND TAX NUMBER | MEDIUM | MODES B, C |
| cc | FACIAL IMAGE | LOW | MODE A |
| ⋮ | ⋮ | ⋮ | ⋮ |

(51) Int. Cl.
    *B60W 10/20*     (2006.01)
    *B60W 30/18*     (2012.01)
    *B60W 50/08*     (2012.01)
    *B60W 50/10*     (2012.01)
    *G01C 21/34*     (2006.01)
    *G05D 1/00*     (2006.01)
    *B60W 50/00*     (2006.01)
    *B60W 30/12*     (2006.01)
    *B60W 30/16*     (2012.01)
    *B60R 25/10*     (2013.01)
    *G01S 19/13*     (2010.01)

(52) U.S. Cl.
    CPC ............ *B60W 10/20* (2013.01); *B60W 30/12* (2013.01); *B60W 30/16* (2013.01); *B60W 30/18163* (2013.01); *B60W 50/0098* (2013.01); *B60W 50/082* (2013.01); *B60W 50/10* (2013.01); *G01C 21/34* (2013.01); *G01C 21/3407* (2013.01); *G05D 1/0088* (2013.01); *B60W 2040/0809* (2013.01); *B60W 2050/0077* (2013.01); *B60W 2050/0085* (2013.01); *B60W 2420/42* (2013.01); *B60W 2420/52* (2013.01); *B60W 2540/28* (2013.01); *B60W 2710/20* (2013.01); *B60W 2720/10* (2013.01); *G01S 19/13* (2013.01)

(58) Field of Classification Search
    USPC .......................................................... 701/23
    See application file for complete search history.

(56) References Cited

FOREIGN PATENT DOCUMENTS

| WO | 2011/158347 | A1 | 12/2011 |
|---|---|---|---|
| WO | 2015/166811 | A1 | 11/2015 |
| WO | 2016/052507 | A1 | 4/2016 |

OTHER PUBLICATIONS

Office Action dated Aug. 29, 2017, issued in counterpart Japanese Application No. 2016-090689. (12 pages).

\* cited by examiner

FIG. 3
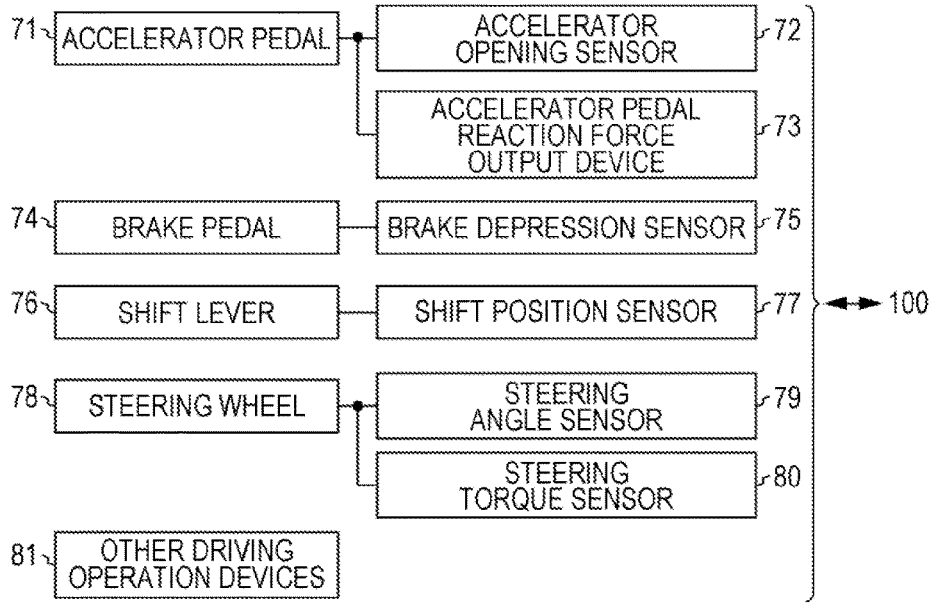
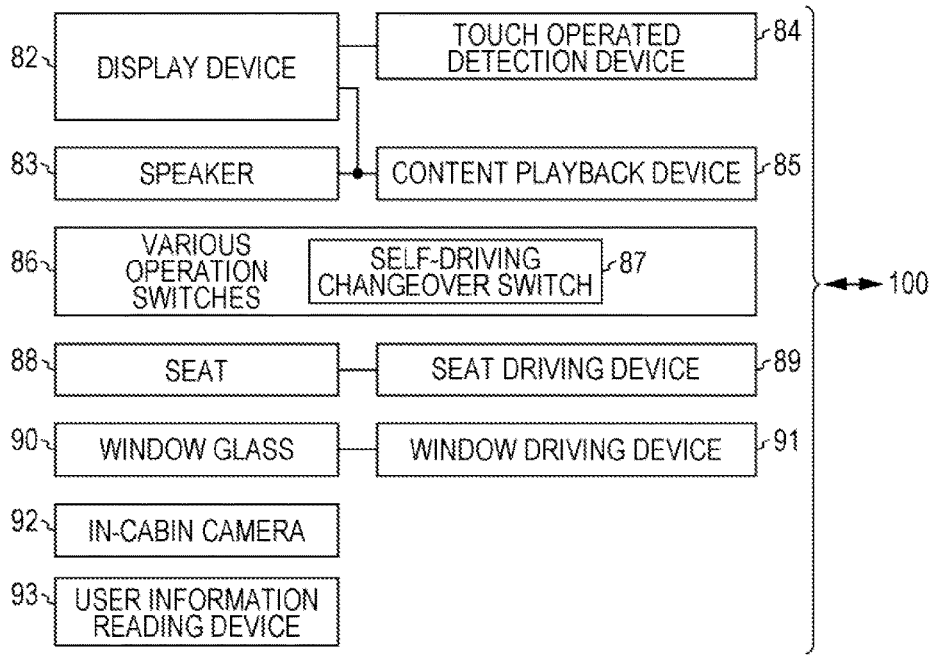

188

| DRIVING MODE<br>NON-DRIVING<br>OPERATION SYSTEM | MANUAL DRIVING MODE | SELF-DRIVING MODE | | | ... |
|---|---|---|---|---|---|
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

| USER ID | SERVER-SIDE AUTHENTICATION INFORMATION | SELF-DRIVING EXECUTION PARAMETERS ||| OTHER SELF-DRIVING SETTINGS |
| --- | --- | --- | --- | --- | --- |
| | | PERMITTED SELF-DRIVING MODES | PERMITTED TRAVEL AREA | | |
| aa | DRIVING LICENSE INFORMATION | MODES A to C | NO LIMIT | | SPORTS MODE |
| bb | SOCIAL SECURITY AND TAX NUMBER | MODES B, C | OO PREFECTURE | | DISPLAY SETTINGS |
| cc | FACIAL IMAGE | MODE A | XX CITY | | ECONOMY MODE |
| ⋮ | ⋮ | ⋮ | ⋮ | | ⋮ |

| USER ID | SERVER-SIDE AUTHENTICATION INFORMATION | SELF-DRIVING EXECUTION PARAMETERS | |
| --- | --- | --- | --- |
| | | PROFICIENCY LEVEL | PERMITTED SELF-DRIVING MODES |
| aa | DRIVING LICENSE INFORMATION | HIGH | MODES A to C |
| bb | SOCIAL SECURITY AND TAX NUMBER | MEDIUM | MODES B, C |
| cc | FACIAL IMAGE | LOW | MODE A |
| ⋮ | ⋮ | ⋮ | ⋮ |

VEHICLE CONTROL SYSTEM, TRAFFIC CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-030689, filed Apr. 28, 2016, entitled "Vehicle Control System, Traffic Control System, Vehicle Control Method, and Vehicle Control Program." The contents of this application are incorporated herein by reference in their entirety.

BACKGROUND

1. Field

The present disclosure, relates to a vehicle control system, a traffic control system, a vehicle control method, and a vehicle control program.

2. Description of the Related Art

Research is ongoing into technology for automatically controlling at least one out of the acceleration/deceleration or the steering of a vehicle such that the vehicle travels along a route to a destination (referred to below as "automated driving"). In relation thereto, a driving assistance system is known that includes an instruction unit that instructs the start of automated driving of a vehicle according to operation performed by a driver, a setting unit that sets a destination for automated driving, a determination unit that determines an automated driving mode based on whether or not a destination has been set in cases in which the instruction unit has been operated, by the driver, and a control unit that performs vehicle travel control based on the automated driving mode determined by the determination unit (for example, see International Publication No. 2011/158347).

However, in International Publication No. 2011/158347, the optimal automated driving for a vehicle occupant cannot always be set.

SUMMARY

The present disclosure describes a vehicle control system, a traffic control system, a vehicle control method, and a vehicle control program capable of easily setting automated driving for each vehicle occupant.

A first aspect of the present disclosure describes a vehicle control system including an automated driving controller that executes automated driving in which at least one out of speed control or steering control of a vehicle is performed automatically, and that executes the automated driving in a mode from out of plural modes with differing degrees of automated driving, and a vehicle-side communication section that communicates with a server for managing characteristic information of a vehicle occupant. The "characteristic information" represents information associated with the vehicle occupant which relates to permission or selection of automated driving modes or area appropriate for the occupant (a driver) in consideration of driving skills, driving record, and the like of the occupant. The information may include preset or preregistered requirements or conditions to allow the vehicle occupant to drive in certain automated driving modes. The automated driving controller controls the automated driving based on the characteristic information of the vehicle occupant received from a server-side communication section using the vehicle-side communication section. The word "section" used in this application may mean a physical part, or component of computer hardware or any device including a controller, a processor, a memory, etc., which is particularly configured to perform functions and steps disclosed in the application.

A second aspect of the present disclosure is the vehicle control system of the first aspect, wherein the characteristic information of the vehicle occupant includes authorization information relating to the driving of the occupant. This vehicle control system further includes an authentication section that authenticates whether or not the vehicle occupant has proper authorization based on the authentication information received from the server-side communication section using the vehicle-side communication, section. The authentication section permits driving the vehicle in cases in which authentication is successful and prohibits driving the vehicle in cases in which authentication has failed.

A third aspect of the present disclosure is the vehicle control system of the first aspect, wherein the characteristic information of the vehicle occupant includes a facial image of the vehicle occupant, or a feature quantity in the facial image. This vehicle control system further includes an imaging section that images an interior space of the vehicle, and an authentication section that compares the characteristic information of the vehicle occupant received from the server using the vehicle-side communication section and the facial image information of the occupant imaged by the imaging section to authenticate whether or not the vehicle occupant has proper authorization. The authentication section permits driving the vehicle in cases in which authentication is successful and prohibits driving the vehicle in cases in which authentication has failed.

A fourth aspect of the present disclosure describes the vehicle control system of the first aspect, wherein the characteristic information of the vehicle occupant includes permitted travel area information for the vehicle occupant. This vehicle control system further includes a position identifying section that identifies a position of the vehicle, and an authentication section that permits driving the vehicle in cases in which a position acquired by the position identifying section is included within a permitted travel area indicated by the permitted travel area information of the occupant received from the server-side communication section using the vehicle-side communication section, and that prohibits driving the vehicle in cases in which a position acquired by the position identifying section is not included within a permitted travel area indicated by the permitted travel area information of the occupant received from the server-side communication section using the vehicle-side communication section.

A fifth aspect of the present disclosure is the vehicle control system of the fourth aspect, further including a notification section and an operation section. In cases in which the automated driving is being executed by the automated driving controller, the notification section gives a notification that the position will depart from the permitted travel area when the position acquired by the position identifying section departs from the permitted travel area. The operation section receives an operation permitting the vehicle to depart from the permitted travel area. The automated driving controller stops automated driving in cases in which an operation permitting the vehicle to depart from, the permitted travel area has not been received by the operation section.

A sixth aspect of the present disclosure is the vehicle control system of the fourth aspect, further including a notification section and an operation section. In cases in which automated driving is being executed by the automated driving controller, the notification section gives a notification that the position will depart from the permitted travel area when the position acquired by the position identifying section departs from the permitted travel area. The operation section receives an operation permitting the vehicle to depart from the permitted travel area. The automated driving controller continues travel of the vehicle in cases in which an operation permitting the vehicle to depart from the permitted travel area has been received by the operation section. The automated driving controller stops the execution of automated driving in cases in which an operation permitting the vehicle to depart from the permitted travel area is not received by the operation section.

A seventh aspect, of the present disclosure is the vehicle control system of one of the first aspect to the sixth aspect, wherein the characteristic information of the vehicle occupant includes information indicating allowed modes of the plural automated driving modes. This vehicle control system further includes a mode controller that selects the automated driving mode to be executed by the automated driving controller, and that causes the automated driving controller to execute the automated driving within a range of the allowed automated driving modes received from the server-side communication section using the vehicle-side communication section.

An eighth aspect of the present disclosure is the vehicle control system of the seventh aspect, wherein the characteristic information of the vehicle occupant includes a proficiency level of the vehicle occupant. This vehicle control system further includes a mode controller that selects the automated driving mode to be executed by the automated driving controller, and that expands the range of selectable modes of the plural modes more the higher the proficiency level received from the server-side communication section using the vehicle-side communication section.

A ninth aspect, of the present, disclosure is the vehicle control system of the eighth aspect, wherein the mode controller restricts a difference in the degree of automated driving before and after changing the automated driving mode more the lower the proficiency level indicated by the proficiency level information received from the server-side communication section using the vehicle-side communication section.

A tenth aspect, of the present, disclosure is the vehicle control system of the ninth aspect, wherein the mode controller lengthens the time required to change the mode more the lower the proficiency level indicated by the proficiency level information received from the server-side communication section using the vehicle-side communication section.

An eleventh aspect of the present disclosure is a traffic control system including the vehicle control system of any one of the first aspect to the ninth aspect, and the server.

A twelfth aspect of the present disclosure is a vehicle control method using an onboard computer to read user information that identifies a vehicle occupant, transmit a request including the read user information to a server for managing the user information, receive execution parameters of the automated driving associated with the user information in the server, and control automated driving in which at least one out of speed control or steering control of the vehicle is performed automatically based on the automated driving execution parameters received from the server.

A thirteenth aspect of the present disclosure is a vehicle control program that causes an onboard computer to read user information that identifies a vehicle occupant, transmit, a request including, the read user information to a server for managing the user information, receive execution parameters of the automated driving associated with the user information in the server, and control automated driving in which at least one out of speed control or steering control of the vehicle is performed automatically based on the automated driving execution parameters received from the server. It is understood and well known in the art that such program may be provided in a form of a computer program product having instructions stored in a computer readable media and readable and executable by a computer such as a vehicle control device to execute the instructions.

According to the first, eleventh, twelfth, and thirteenth aspects of the present disclosure, automated driving can be easily set for each vehicle occupant.

According to the second, third, and fourth aspects of the present disclosure, causing automated driving of the vehicle enables theft of the vehicle to be suppressed.

According to the fifth and sixth aspects of the present disclosure, the permitted travel area where automated driving is performed can be easily set for each vehicle occupant.

According to the seventh aspect of the present disclosure, an automated driving mode can be easily set for each vehicle occupant.

According to the eighth, ninth, and tenth aspects of the present disclosure, switching of automated driving modes can be easily set based on the proficiency level of a vehicle occupant.

BRIEF DESCRIPTION OF THE DRAWINGS

FIG. 3 is configuration diagram of an HMI.

FIG. 13 is a table illustrating an example of an occupant characteristic information database.

FIG. 18 is a table illustrating an example of an occupant characteristic information database.

DESCRIPTION OF THE PREFERRED EMBODIMENTS

Figure 1:
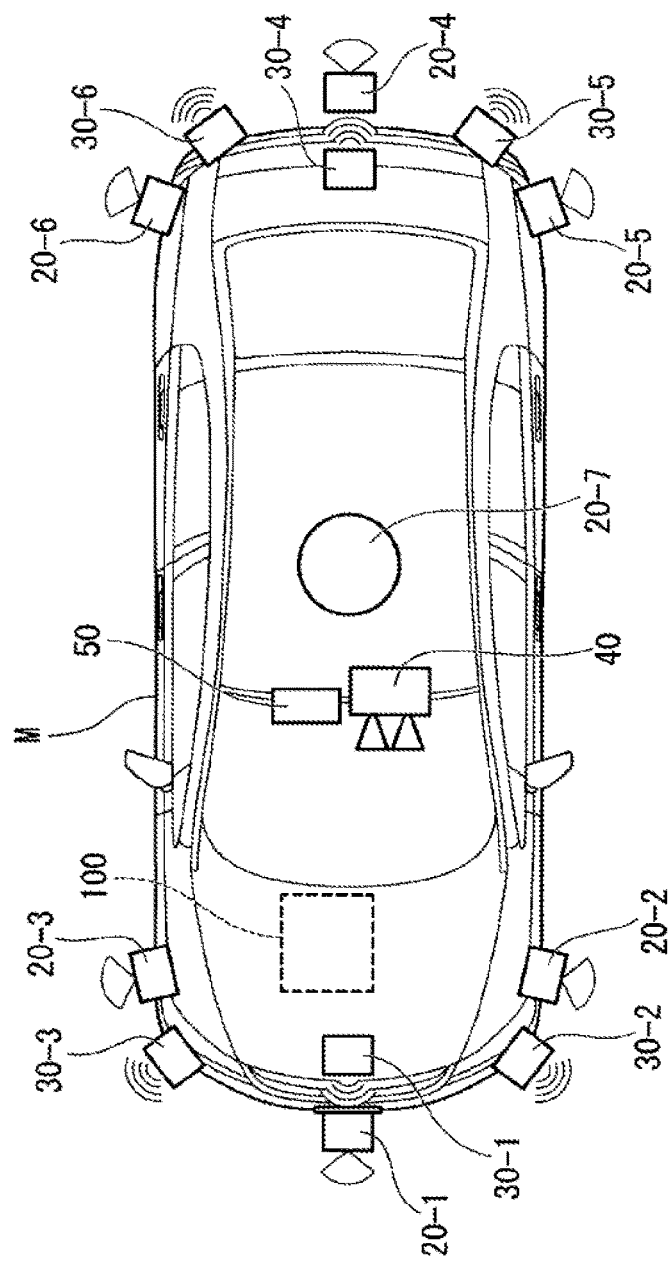
FIG. 1 is a diagram illustrating configuration elements of a vehicle.

Explanation follows regarding an embodiment of a vehicle control system, a traffic control system, a vehicle control method, and a vehicle control program of the present disclosure, with reference to the drawings.
Shared Configuration FIG. 1 is a diagram illustrating configuration elements of a vehicle (referred to below as vehicle M) installed with a vehicle control system 100. The vehicle installed with the vehicle control system 100 is, for example, a two-wheeled, three-wheeled, or four-wheeled automobile, and may be automobile with an internal combustion engine such as a diesel engine or a gasoline engine configuring a motive power source, an electric automobile with an electric motor configuring a motive power source, a hybrid automobile provided with both an internal combustion engine and an electric motor, or the like. An electric automobile is, for example, driven using power discharged by a battery such as a secondary cell, a hydrogen fuel cell, a metal fuel cell, or an alcohol fuel cell.

As illustrated, in FIG. 1, sensors such as finders 20-1 to 20-7, radars 30-1 to 30-6, and a camera 40, a navigation device 50, and the vehicle control system 100 are installed in the vehicle M.

The finders 20-1 to 20-7 are, for example, LIDARs (Light Detection and Ranging, or Laser Imaging Detection and Ranging) that measure the scattering of emitted light, and measure the distance to a target. As an example, the finder 20-1 is attached to a front grille or the like, and the finders 20-2 and 20-3 are, for example, attached to side faces of the vehicle body, to door mirrors, inside front headlights, or in the vicinity of side lights. The finder 20-4 is attached to a trunk lid or the like, and the finders 20-5 and 20-6 are attached to side faces of the vehicle body or inside taillights, for example. The finders 20-1 to 20-6 described above have, for example, a detection region of approximately 150° in the horizontal direction. The finder 20-7 is attached to the roof, for example. The finder 20-7, for example, has a detection region of 360° in the horizontal direction.

The radars 30-1 and 30-4 are, for example, long range millimeter wave radars that have a wider detection region in the depth direction than the other radars. The radars 30-2, 30-3, 30-5, and 30-6 are intermediate range millimeter wave radars that have a narrower detection region in the depth direction than the radars 30-1 and 30-4.

In the following, the finders 20-1 to 20-7 are denoted simply as "finders 20" when no particular distinction is being made, and the radars 30-1 to 30-6 are denoted simply as "radars 30" when no particular distinction is being made. The radars 30 detect objects using a frequency-modulated continuous-wave (FM-CW) method, for example.

The camera 40 is, for example, a digital camera that employs a solid-state imaging element such as a charge-coupled device (CCD) or a complementary metal-oxide-semiconductor (CMOS) element. The camera 40 is, for example, attached to an upper portion of the front windshield or to the back face of the rear view mirror. The camera 40, for example, periodically and repeatedly images in front of the vehicle M. The camera 40 may be a stereo camera that includes plural cameras.

Note that the configuration illustrated in FIG. 1 is merely an example, and part of this configuration may be omitted, and other configuration may be added.

First Embodiment

Figure 2:
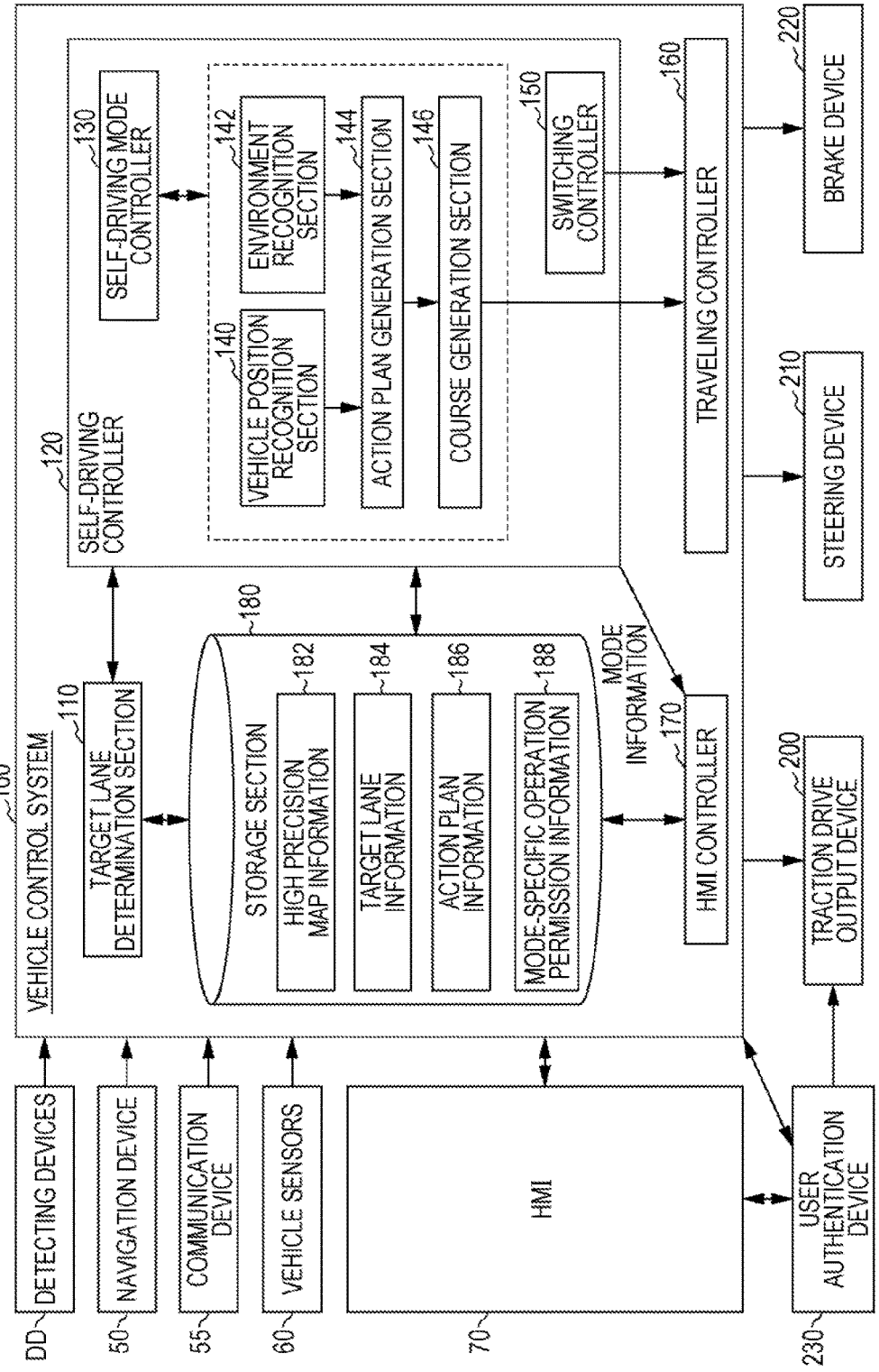
FIG. 2 is a functional configuration diagram focused on a vehicle control system.

FIG. 2 is a functional configuration diagram focused on the vehicle control system 100. The vehicle M is installed with detection devices DD, which include the finders 20, the radars 30, the camera 40, and the like, the navigation device 50, a communication device 55, vehicle sensors 60, a human machine interface (HMI) 70, the vehicle control system 100, a traction drive output device 200, a steering device 210, a brake device 220, and a user authentication device 230. These devices and apparatuses are connected to one another by a multiplexed communication line such as a controller area network (CAN) communication line, or by a serial communication line, a wireless communication network, or the like. Note that the vehicle control system within the scope of the claims does not indicate only the "vehicle control system 100", and may include configuration other than that, of the vehicle control system 100 (such as the detection devices DD and the HMI 70).

The navigation device 50 includes a global navigation satellite system (GNSS) receiver and map information (navigation map), a touch-panel display device that, functions as a user interface, a speaker, a microphone, and the like. The navigation device 50 identifies the position of the vehicle M using the GNSS receiver, and derives a route from this position to a destination designated by a user. The route derived by the navigation device 50 is provided to a target lane determination section 110 of the vehicle control system 100. The position of the vehicle M may be identified, or supplemented, by using an inertial navigation system (INS) that utilizes output from the vehicle sensors 60. When the vehicle control system 100 is executing a manual driving mode, the navigation device 50 provides guidance using speech, and navigational display of the route to the destination. Note that configuration for identifying the position of the vehicle M may be provided independently of the navigation device 50. The navigation device 50 may be realized, for example, by one function of a terminal device such as a smartphone or a tablet terminal in the possession of the user. In such a case, information is exchanged using wireless or wired communication between the terminal device and the vehicle control system 100.

The communication device 55, for example, performs wireless communication using dedicated short, range communication (DSRC), or the like. Note that the communication device 55 may also communicate with an external device through a cellular network, a Wi-Fi network, or Bluetooth (registered trademark). The communication device 55, as described below, communicates with a server 300 that manages user information.

The vehicle sensors 60 include, for example, a vehicle speed sensor that detects vehicle speed, an acceleration sensor that detects acceleration, a yaw rate sensor that detects angular velocity about a vertical axis, and a direction sensor that detects the orientation of the vehicle M.

FIG. 3 is a configuration diagram of the HMI 70. The HMI 70 includes, for example, configuration of a driving operation system, and configuration of a non-driving operation system. There is no clear boundary between the two, and the configuration for the driving operation system may include non-driving operation system functionality (and vice versa).

As configuration of the driving operation system, the HMI 70 includes, for example, an accelerator pedal 71, an accelerator opening sensor 72 and an accelerator pedal reaction force output device 73, a brake pedal 74 and a brake depression sensor (alternatively, a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions (or deceleration instructions due to return-operation) from a vehicle occupant. The accelerator opening sensor 72 detects a depression amount of the accelerator pedal 71, and outputs an accelerator opening signal indicating the depression amount to the vehicle control system 100. Note that instead of outputting to the vehicle control system 100, output may be made directly to the traction drive output device 200, the steering device 210, or the brake device 220. Similar applies to other configuration of the driving operation system explained below. The accelerator pedal reaction force output device 73, for example, outputs a force (an operation reaction force) in the opposite direction to the operation direction of the accelerator pedal 71, according to an instruction from the vehicle control system 100.

The brake pedal 74 is an operation element for receiving deceleration instructions from a vehicle occupant. The brake depression sensor 75 detects a depression amount of (alternatively, the pressing force on) the brake pedal 74, and outputs a brake signal indicating the detection result to the vehicle control system 100.

The shift lever 76 encompasses a shift lever that serves as an operation element for receiving shift level change instructions from the vehicle occupant. The shift position sensor 77 detects the shift level instructed by the vehicle occupant and outputs a shift position signal indicating the detection result to the vehicle control system 100.

The steering wheel 78 is an operation element for receiving turning instructions from the vehicle occupant. The steering angle sensor 79 detects the steering angle of the steering wheel 78 and outputs a steering angle signal indicating the detection result to the vehicle control system 100. The steering torque sensor 80 detects the torque applied to the steering wheel 78 and outputs a steering torque signal indicating the detection result to the vehicle control system 100.

The other driving operation devices 81 are, for example, a joystick, a button, a dial switch, a graphical user interface (GUI) switch, and the like. The other driving operation devices 81 receive acceleration instructions, deceleration instructions, turning instructions, and the like, and outputs these instructions to the vehicle control system 100.

As configuration of the non-driving operation system, the HMI 70 includes, for example, a display device 82, a speaker 83, a touch operated detection device 84 and a content playback device 85, various operation switches 86, a seat 88 and a seat driving device 89, window glass 90 and a window driving device 91, an in-cabin camera 92, and a user information reading device 93.

The display device 82 is a display device that is viewed by a vehicle occupant. The display device 82 is, for example, a liquid crystal display (LCD), an organic electroluminescent (EL) display device, or the like, attached to respective sections of an instrument panel, freely selected locations facing the front passenger seat and rear seat, and so on. The display device 82 may be a head-up display (HUD) that projects an image onto the front windshield or another window such that the image is able to be viewed from inside the vehicle.

In cases in which an in-cabin display 82A is a touch panel, the touch operated detection device 84 detects contact positions (touched positions) on the display screen of the in-cabin display 82A and outputs these to the vehicle control system 100. Note that in cases in which the in-cabin display 82A is not a touch panel, the touch operated detection device 84 may be omitted.

The speaker 83 outputs audio. The speaker 83 emits sound inside the vehicle cabin. The speaker 83 is a speaker built into the vehicle cabin and emits sound inside the vehicle cabin.

The content playback device 85 includes, for example, a digital versatile disc (DVD) playback device, a compact disc (CD) playback device, a television receiver, various guidance image generation devices, and the like. Some or all of the display device 82, the speaker 83, the touch operated detection device 84, and the content playback device 85 may be configured so as to be shared with the navigation device 50.

The various operation, switches 86 are disposed at freely selected places inside the vehicle cabin. The various operation switches 86 include an automated driving changeover switch 87 for instructing automated driving to start (or to start in the future) and stop. The automated driving changeover switch 87 may be either a graphical user interface (GUI) switch or a mechanical switch. The various operation switches 86 may include switches for driving the seat driving device 89 and the window driving device 91.

The seat 88 is a seat in which a vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 30.

The in-cabin camera 92 is a digital camera that employs a solid state imaging element such as a CCD or CMOS element. The in-cabin camera 92 is attached to a position from which at least the head of a vehicle occupant performing a driving operation can be imaged, such as the rear view mirror, steering wheel boss, or instrument panel. The in-cabin camera 92, for example, periodically and repeatedly images the vehicle occupant.

The user information reading device 93 acquires the user information of a vehicle occupant. The user information reading device 93 is, for example, a communication device that acquires user information for identifying a vehicle occupant from a portable terminal in the possession of the vehicle occupant. The user information reading device 93 may be a RFTD communication device that reads user information from an IC chip embedded in the material of a card such, as a driving license or a social security and tax number card in the possession of a vehicle occupant. The user information reading device 93 sends the acquired user information to an HMI controller 170. The user information reading device 93 may double as the communication device 55 performing short-range communication with the portable terminal in the possession of the vehicle occupant. Note that, user information may be a user ID such as a number by which a user of the vehicle M (vehicle occupant) can be uniquely identified; however, there is no limitation thereto, and so long as it is information that enables a vehicle occupant to be identified, the user information may be a terminal ID of a portable terminal in the possession of a user, or the like.

Prior to explaining the vehicle control system 100, explanation follows regarding the traction drive output, device 200, the steering device 210, the brake device 220, and the user authentication device 230.

The traction drive output device 200 outputs to a drive wheel traction drive (torque) to cause the vehicle to travel. In cases in which the vehicle M is an automobile that has an internal combustion engine as the motive power source, the traction drive output device 200 includes, for example, an engine, a transmission, and an engine electronic control unit (ECU) that controls the engine. In cases in which the vehicle M Is an electric automobile that has an electric motor as the motive power source, the traction drive output device 200 includes, for example, a traction motor and a motor ECU that, controls the traction motor. In cases in which the vehicle M is a hybrid automobile, the traction drive output device 200 includes, for example, an engine, a transmission, and an engine ECU, and a traction motor and motor ECU. In cases in which the traction drive output device 200 includes only an engine, the engine ECU adjusts the engine throttle opening, the shift level, or the like, in accordance with information input, from a traveling controller 160, described later. In cases in which the traction drive output device 200 includes only a traction motor, the motor ECU adjusts a duty ratio of a PWM signal applied to the traction motor, in accordance with information input from the traveling controller 160. In cases in which the traction drive output device 200 includes an engine and a traction motor, the engine ECU and the motor ECU cooperatively control traction drive, in accordance with information input from the traveling controller 160.

The steering device 210 includes, for example, a steering ECU, and an electric motor. This electric motor, for example, applies force in a rack and pinion mechanism to change the orientation of the steering wheel. The steering ECU drives the electric motor in accordance with information input from the vehicle control system 100, or inputted information regarding the steering angle or steering torque, and changes the orientation of the steering wheel.

The brake device 220 is, for example, an electronic servo brake device including a brake caliper, a cylinder that transmits hydraulic pressure to the brake caliper, an electric motor that causes the cylinder to generate hydraulic pressure, and a brake controller. The brake controller of the electronic servo brake device controls the electric motor in accordance with information input from the traveling controller 160, such that braking torque is output to each wheel in accordance with the braking operation. The electronic servo brake device may include a backup mechanism that transmits hydraulic pressure generated due to operation of the brake pedal to the cylinder via a master cylinder. Note that the brake device 220 is not limited to the electronic servo brake device explained above, and may be an electronically controlled hydraulic pressure brake device. The electronically controlled hydraulic pressure brake device controls an actuator in accordance with information input from the traveling controller 160, and transmits the hydraulic pressure of a master cylinder to the cylinder. The brake device 220 may also include a regenerative brake that uses a traction motor which might be included in the traction drive output device 200.

The user authentication device 230 performs authentication processing with respect to the authorization of a vehicle occupant to drive the vehicle M. The user authentication device 230 permits the output of traction drive from the traction drive output device 200 when authentication is successful. The user authentication device 230 prohibits the output of traction drive from the traction drive output device 200 when authentication has failed. The prohibition of output may be enacted through the vehicle control system 100, or may be performed by communication between the user authentication device 230 and the traction drive output device 200.

Vehicle Control System

Explanation follows regarding the vehicle control system 100. The vehicle control system 100 is, for example, implemented by one or more processor, or by hardware having equivalent functionality. The vehicle control system 100 may be configured by a combination of a processor such as a central processing unit (CPU), a storage device, and an ECU (electronic control unit) in which a communication interface is connected by an internal bus, or an MPU (micro-processing unit) or the like.

Returning to FIG. 2, the vehicle control system 100 includes, for example, the target lane determination section 110, an automated driving controller 120, the traveling controller 160, and a storage section 180. The automated driving controller 120 includes, for example, an automated driving mode controller 130, a vehicle position recognition section 140, an environment recognition section 142, an action plan generation section 144, a course generation section 146, and a switching controller 150. Some or all out of the target lane determination section 110, the respective sections of the automated driving controller 120, and the traveling controller 160 are implemented by the processor executing a program (software). Of these, some or all may be implemented by hardware such as a large scale integrated (LSI) circuit or an application specific integrated circuit (ASIC), or may foe implemented by a combination of software and hardware.

The storage section 180 stores, for example, information such as high precision map information 182, target lane information 184, action plan information 186, and mode-specific operation permission information 188. The storage section 180 is implemented by read only memory (ROM), random access memory (RAM), a hard disk drive (HDD), flash memory, or the like. The program executed by the processor may be pre-stored in the storage section 180, or may be downloaded from an external device via an onboard internet setup or the like. Additionally, the program may be installed in the storage section 180 by loading a portable storage medium storing the program into a drive device, not illustrated in the drawings. Moreover, the vehicle control system 100 may be distributed across plural computer devices (onboard computers).

The target lane determination section 110 is, for example, implemented by an MPU. The target lane determination section 110 divides the route provided from the navigation device 50 into plural blocks (for example, divides the route every 100 m along the vehicle direction of progress of the vehicle), and references the high precision map information 182 to determine a target lane for each block. The target lane determination section 110, for example, determines which number lane from the left to travel in. The target lane determination section 110, for example, determines the target lanes such that the vehicle M is able to travel along a logical traveling route for proceeding to a junction in cases in which a junction point, a merge point, or the like is present in the route. The target lanes determined by the target lane determination section 110 are stored in the storage section 180 as the target lane information 184.

The high precision map information 182 is map information, that is more precise than the navigation map of the navigation device 50. The high precision map information. 182 includes, for example, lane center information, lane boundary information, or the like. Moreover, the high precision map information 182 may include, for example, road information, traffic regulation information, address information (address, postcode), facilities information, phone number information, and the like. The road information includes information such as information indicating whether the type of road is an urban road, a toll road (including expressways), a national route, or a prefectural road, the number of lanes in the road, the width of each lane, the gradient of the road, the position of the road (three dimensional coordinates including a longitude, a latitude, and an altitude), the curvature of curves in the lanes, the position of lane merge points and junction points, and signage provided on the road. The traffic regulation information includes information regarding lane closures due to road work, traffic accidents, congestion, and the like.

The automated driving mode controller 130 determines the automated driving mode to be carried out by the automated driving controller 120. The automated driving modes of the present embodiment include the following modes. Note that the following modes are merely examples and the number of automated, driving modes may be freely determined.

Mode A

Mode A is the mode in which the degree of automated driving is highest. In cases in which the mode A is being carried out, all vehicle controls, such as complex merging control, are performed automatically, such that, a vehicle occupant does not need to monitor the surroundings or state of the vehicle M.

Mode B

Mode B is the mode having the next highest degree of automated driving after mode A. Although in principle all vehicle control is performed automatically in cases in which mode B is being carried out, the driving operation of the vehicle M may be entrusted to the vehicle occupant depending on the situation. The vehicle occupant therefore needs to monitor the surroundings and state of the vehicle M.

Mode C

Mode C is the mode having the next highest degree of automated driving after mode B. In cases in which mode C is being carried out, the vehicle occupant needs to perform confirmation operations on the HMI 70 in accordance with the situation. In mode C, for example, the vehicle occupant is notified of the timing for a lane change, and in cases in which the vehicle occupant has performed an operation on the HMI 70 instructing a lane change, the lane change is automatically made. The vehicle occupant therefore needs to monitor the surroundings and state of the vehicle M.

The automated driving mode controller 130 determines the automated driving mode based on operation on the HMI 70 by the vehicle occupant, events determined by the action plan generation section 144, traveling states determined by the course generation section 146, and the like. The automated driving mode is notified to the HMI controller 170. A limit that depends on the capability or the like of the detection devices DD of the vehicle M may also be set on the automated driving mode. For example, configuration may be such that mode A is not carried out in cases in which the capability of the detection devices DD is low. In any mode, it is possible to switch to the manual driving mode (override) by an operation on the configuration of the driving operation system in the HMI 70.

The vehicle position recognition section 140 of the automated driving controller 120 recognizes the lane in which the vehicle M is traveling (the lane of travel) and the relative position of the vehicle itself M with respect to the lane of travel, based on the high precision map information 182 stored in the storage section 180, and the information input from the finders 20, the radars 30, the camera 40, the navigation device 50, or the vehicle sensors 60.

The vehicle position recognition section 140, for example, recognizes the lane of travel by comparing a pattern of road demarcation lines (for example, an array of solid lines or dashed lines) recognized in the high precision map information 182 against a road demarcation line pattern of the surroundings of the vehicle M recognized in the images imaged by the camera 40. In this recognition, the position of the vehicle M acquired from the navigation device 50, or the processing result from the INS, may be taken into account.

Figure 4:
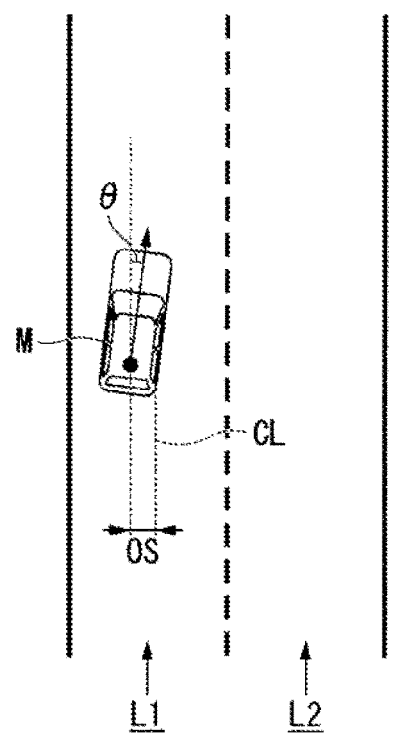
FIG. 4 is a diagram illustrating a manner in which the relative position of a vehicle with respect to a lane of travel is recognized by a vehicle position recognition section.

FIG. 4 is a diagram illustrating a manner in which the relative position of the vehicle M with respect to a lane of travel L1 is recognized by the vehicle position recognition section 140. The vehicle position recognition section 140 recognizes, for example, an offset OS between a reference point (for example, the center of mass) of the vehicle M and a lane of travel center CL, and an angle $\theta$ formed between the direction of progress of the vehicle M and a line aligned with the lane of travel center CL, as the relative position of the vehicle M with respect to the lane of travel L1. Note that, alternatively, the vehicle position recognition section 140 may recognize the position of the reference point of the vehicle M or the like with respect to either of the side end portions of the lane L1 as the relative position of the vehicle M with respect to the lane of travel. The relative position of the vehicle M recognized by the vehicle position recognition section 140 is provided to the target lane determination section 110.

The environment recognition section 142 recognizes states such as the position, speed, and acceleration of nearby vehicles based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be expressed as representative points such as at the centers of mass or corners of other vehicles, or may be expressed as regions represented by the outlines of the other vehicles. The "state" of a nearby vehicle may include whether or not the nearby vehicle is accelerating or changing lanes (or whether or not the nearby vehicle is attempting to change lanes), as ascertained based on the information of the various apparatuses described above. Moreover, the environment recognition section 142 may recognize the position of a guard rail, a utility pole, a parked vehicle, a pedestrian, a person riding a bike or the like, or other objects, in addition to nearby vehicles.

The action plan generation section 144 sets a starting point, of automated driving and/or a destination of automated driving. The starting point of automated driving may foe the current position of the vehicle M, or may be a point set by an operation instructing automated driving. The action plan generation section 144 generates an action plan in the sections between the starting point and the destination of automated driving. Note that there is no limitation thereto. The action plan generation section 144 may generate an action plan for freely selected sections.

The action plan is, for example, composed of plural events to be sequentially executed. The events include, for example: a deceleration event, that causes the vehicle M to decelerate, an acceleration event that causes the vehicle M to accelerate, a lane keep event, that causes the vehicle M to travel without departing from the lane of travel, a lane change event that causes the lane of travel to be changed, an overtake event that causes the vehicle M to overtake the vehicle in front, a junction event that causes a change to a desired lane at a junction point or that causes the vehicle M to travel so as not to depart from the current lane of travel, a merge event that causes the vehicle M to accelerate or decelerate at a merge point for merging with a main lane and change the lane of travel, and a handover event that causes a transition from manual driving mode to automated driving mode at a start point of automated driving or causes a transition, from, automated driving mode to manual driving mode at an anticipated end point of automated driving. The action plan generation section 144 sets a lane change event, a junction event, or a merge event at places where the target, lane determined by the target lane determination section 110 switches. Information expressing an action plan generated by the action plan generation section 144 is stored in the storage section 180 as the action plan information 186.

Figure 5:
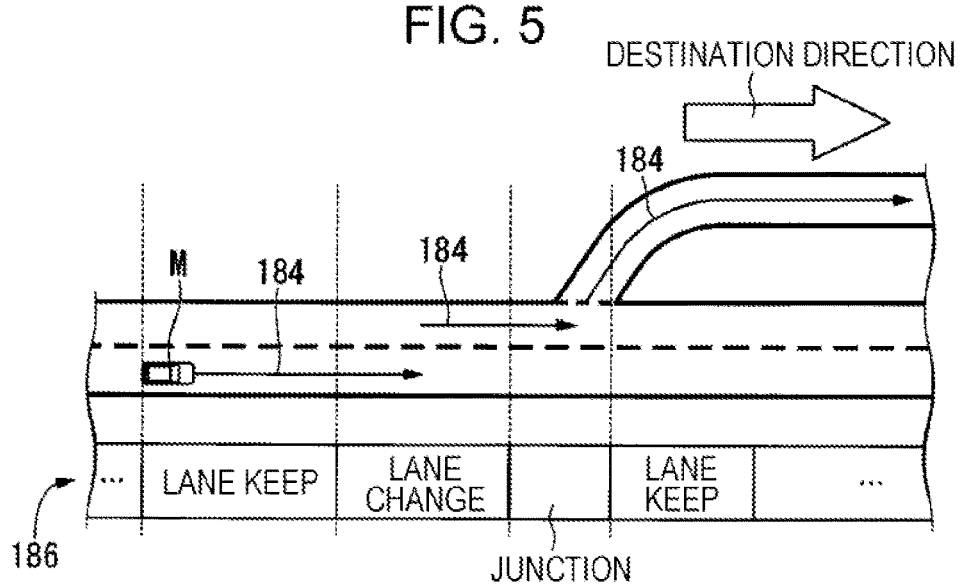
FIG. 5 is a diagram illustrating an example of an action plan generated for a given section of road.

FIG. 5 is a diagram illustrating an example of an action plan generated for a given section of road. As illustrated in this figure, the action plan generation section 144 generates the action plan needed for the vehicle M to travel in the target, lane indicated by the target lane information 184. Note that, the action plan generation section 144 may dynamically change the action plan irrespective of the target lane information 184, in accordance with changes to the conditions of the vehicle M. For example, in cases in which the speed of a nearby vehicle recognized by the environment recognition section 142 during vehicle travel exceeds a threshold value, or the direction of movement of a nearby vehicle traveling in a lane adjacent, to the vehicle's own lane is headed toward the vehicle's own lane, the action plan generation section 144 changes the events set in the driving section in which the vehicle M is expected to travel. For example, in cases in which events have been set such that a lane change event will be executed after a lane keep event, when, during the lane keep event, the recognition, result of the environment recognition, section 142 finds that a vehicle has approached from the rear in the lane change target lane, at a speed at or above a threshold value, the action plan generation section 144 may change the event following the lane keep event from a lane change event to a deceleration event, a lane keep event, or the like. As a result, the vehicle control system 100 can cause the vehicle M to automatically drive safely even in cases in which a change in the state of the environment has occurred.

Figure 6:
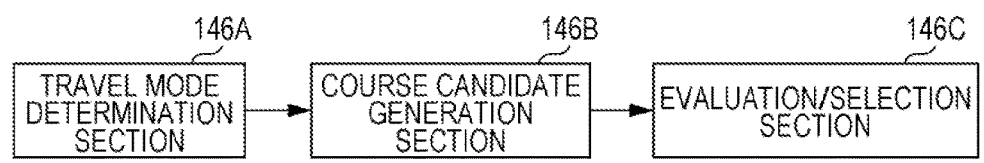
FIG. 6 is a diagram illustrating an example of configuration of a course generation section.

FIG. 6 is a diagram illustrating an example of configuration of the course generation section 146. The course generation section 146 includes, for example, a travel mode determination section 146A, a course candidate generation section 146B, and an evaluation/selection section 146C.

When carrying out a lane keep event, the travel mode determination section 146A, for example, determines a travel mode from out of constant speed travel, following travel, low speed following travel, decelerating travel, curve travel, obstacle avoidance travel, or the like. For example, the travel mode determination section 146A determines the travel mode to be constant speed travel when no other vehicles are present in front of the vehicle M. The travel mode determination section 146A determines the travel mode to be following travel in cases such as that in which a vehicle in front is to be followed. The travel mode determination section 146A determines the travel mode to be low speed following travel in a congested situation or the like. The travel mode determination section 146A determines the travel mode to be decelerating travel in cases in which deceleration of a vehicle in front has been recognized by the environment recognition section 142 or when carrying out an event such as stopping or parking. The travel mode determination section 146A determines the travel mode to be curve travel in cases in which the environment recognition section 142 has recognized that the vehicle M is approaching a curved road. The travel mode determination section 146A determines the travel mode to be obstacle avoidance travel in cases in which the environment recognition section 142 has recognized an obstacle in front of the vehicle M. When carrying out lane change events, overtake events, junction events, merge events, handover events, or the like, the travel mode determination section 146A determines the travel mode in accordance with each event.

Figure 7:
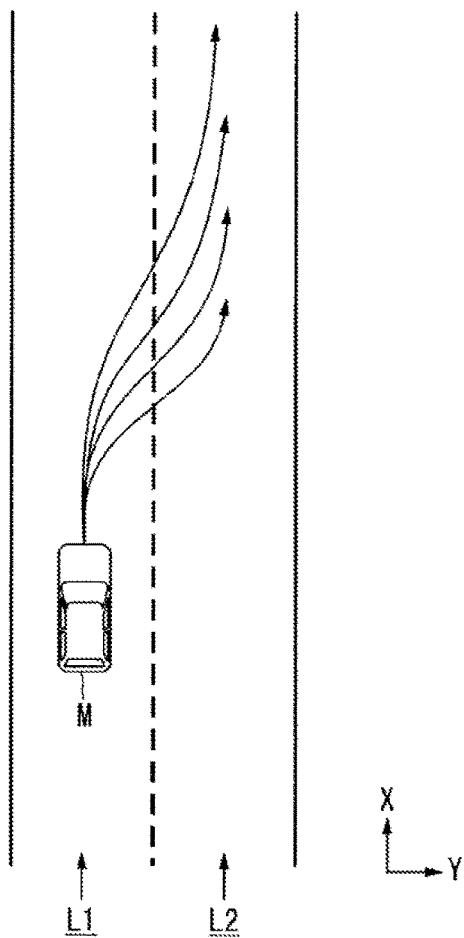
FIG. 7 is a diagram illustrating example candidates for a course generated by a course candidate generation section.

The course candidate generation section 146B generates candidates for a course based on the travel mode determined by the travel mode determination section 146A. FIG. 7 is a diagram illustrating example candidates for a course generated by the course candidate generation section 146B. FIG. 7 illustrates candidates for a course generated when the vehicle M changes lanes from a lane L1 to a lane L2.

Figure 8:
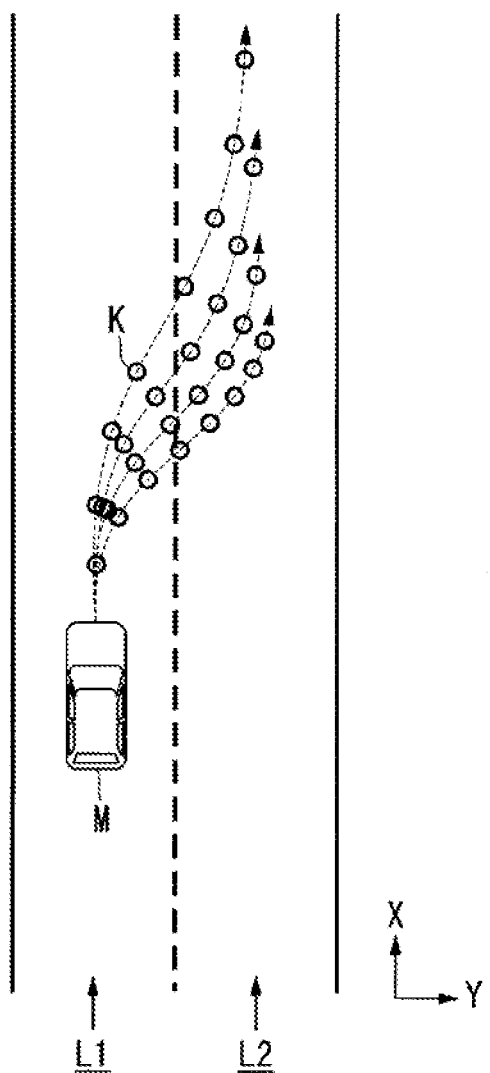
FIG. 8 is a diagram in which candidates for a course generated by the course candidate generation section are represented by course points.

Courses such as illustrated in FIG. 7, for example, are determined by the course candidate generation section 146B as collections of target positions (course points K) where the reference position (for example, the center of mass or rear wheel axle center) of the vehicle M is due to arrive at specific times in the future. FIG. 8 is a diagram in which candidates for a course generated by the course candidate generation section 146B are represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 9:
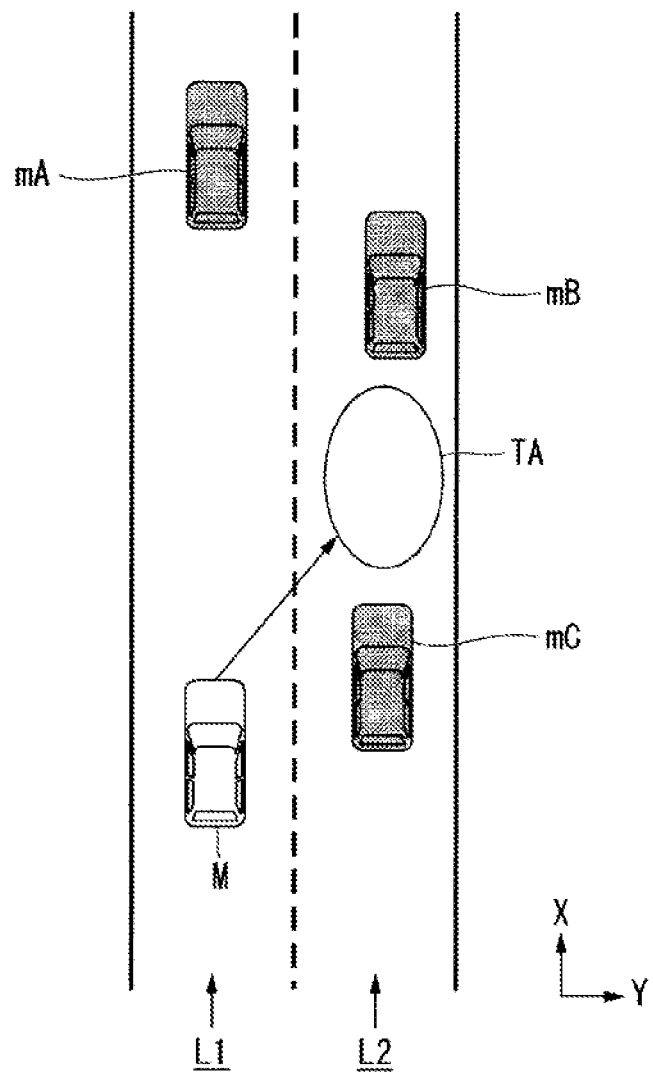
FIG. 9 is a diagram illustrating a lane change target area.

Explanation follows regarding a determination method for a target speed for performing a lane change (including junctions). The course candidate generation section 146B first sets a lane change target position (or a merge target position). The lane change target position is a position set relative to nearby vehicles, and determines "between which nearby vehicles to change lanes". The course candidate generation section 146B observes three nearby vehicles as references for the lane change target position, and determines a target speed for performing the lane change. FIG. 9 is a diagram illustrating a lane change target area TA. In this figure, L1 represents the vehicle's own lane, and L2 represents an adjacent lane. Here, a vehicle in front mA is defined as a nearby vehicle traveling directly ahead of the vehicle M in the same lane as the vehicle M, a front reference vehicle mB is defined as a nearby vehicle traveling directly ahead of the lane change target area TA, and a rear reference vehicle mC is defined as a nearby vehicle traveling directly behind the lane change target area TA. The vehicle M needs to accelerate or decelerate to move beside the lane change target area TA, but must avoid tailgating the vehicle in front mA at this time. The course candidate generation section 146B therefore predicts the future state of the three nearby vehicles and determines a target speed that will not interfere with any of the nearby vehicles.

Figures 10, 11:
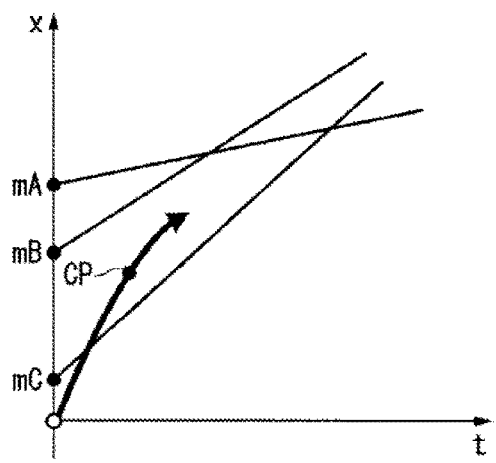
FIG. 10 is a diagram illustrating a speed generation model when the speeds of three nearby vehicles are assumed to be constant.
FIG. 11 is a table illustrating an example of mode-specific operation permission information.

FIG. 10 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target-speeds are applied to a model such as a spline curve such that plural candidates for the course are derived as illustrated in FIG. 8. Note that the movement pattern of the three nearby vehicles is not limited to that of constant speeds such as illustrated in FIG. 10, and may be predicted under the assumption of constant acceleration or constant jerk (surge).

The evaluation/selection section 146C, for example, evaluates the candidates for the course generated by the course candidate generation section 146B from the two viewpoints of plan achievability and safety, and selects a course for output to the traveling controller 160. From the viewpoint of plan, achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then return is given a low evaluation. From the viewpoint of safety, for example, the further the distance between the vehicle M and an object (such as a nearby vehicle) and the smaller the amount of change in acceleration/deceleration, steering angle, or the like, at each course point, the higher the evaluation.

The switching controller 150 switches between the automated driving mode and the manual driving mode based on a signal input from the automated driving changeover switch 87. The switching controller 150 also switches from the automated driving mode to the manual driving mode based on an operation on the configuration of the driving operation system of the HMI 70 instructing acceleration, deceleration, or steering. For example, the switching controller 150 switches from the automated driving mode to the manual driving mode (overrides) when a state in which an operation amount indicated by the signal input from the configuration of the driving operation system of the HMI 70 exceeds a threshold value has continued for a reference duration or longer. After switching to the manual driving mode due to override, the switching controller 150 may return to the automated driving mode in cases in which operation on the configuration of the driving operation system of the HMI 70 is not detected for a specific amount of time.

The traveling controller 160 controls the traction drive output device 200, the steering device 210, and the brake device 220 such that, the vehicle M passes through the course generated by the course generation section 146 at expected timings.

When notified of information relating to the automated driving mode by the automated driving controller 120, the HMI controller 170 references the mode-specific operation permission information 188, and controls the HMI 70 according to the classification of the automated driving mode.

FIG. 11 is a table illustrating an example of the mode-specific operation permission information 188. The mode-specific operation permission information 188 illustrated in FIG. 11 includes "manual driving mode" and "automated driving mode" as driving mode items. "Mode A", "mode B", "mode C", and the like described above are included as "automated driving modes". The mode-specific operation permission information 188 also includes "navigation, operation", which is an operation on the navigation device 50, "content playback operation", which is an operation, on the content playback device 85, "instrument panel operation", which is an operation on the in-cabin display 82A, and the like, as non-driving operation system items. In the example mode-specific operation permission information 188 illustrated in FIG. 11, permissibility is set for operations on the non-driving operation system by a vehicle occupant for each of the driving modes described above; however, the relevant interface devices are not limited thereto.

The HMI controller 170 determines the devices for which usage is permitted (part or all of the navigation device 50 and the HMI 70) and the devices for which usage is not permitted, by referencing the mode-specific operation permission information 188 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system of the HMI 70 (for example, the accelerator pedal 71, the brake pedal 74, the shift lever 76, the steering wheel 78, and the like). When the driving mode executed by the vehicle control system 100 is mode 8, mode C, or the like, of the automated driving mode, the vehicle occupant has a responsibility to monitor the surroundings of the vehicle M. In such a case, in order to prevent activities (driver distractions) other than driving (for example, operating the HMI 70) from distracting the attention of the vehicle occupant, the HMI controller 170 performs control such that part or all of the non-driving operation system of the HMI 70 does not receive operations. At such times, in order to promote monitoring of the surroundings of the vehicle M, the HMI controller 170 may cause the presence of vehicles surrounding the vehicle M that have been recognized by the environment recognition section 142 and the state of these nearby vehicles to be displayed on the display device 82 using images or the like, and the HMI controller 170 may ensure confirmation operations are received by the HMI 70 in accordance with the situation when the vehicle M is traveling.

When the driving mode is mode A of the automated driving mode, the HMI controller 170 relaxes driver distraction regulations, and performs control such that non-driving operation systems that were not receiving operations now receive operations from the vehicle occupant. For example, the HMI controller 170 displays an image on the display device 82, outputs audio through the speaker 83, or plays back content from a DVD or the like on the content playback device 85. Note that in addition to content stored on a DVD or the like, the content played back by the content playback device 85 may include, for example, various content related to leisure and entertainment, such as television programming or the like. The "content playback operation" illustrated in FIG. 11 may also mean a content operation related to such leisure and entertainment.

Figure 12:
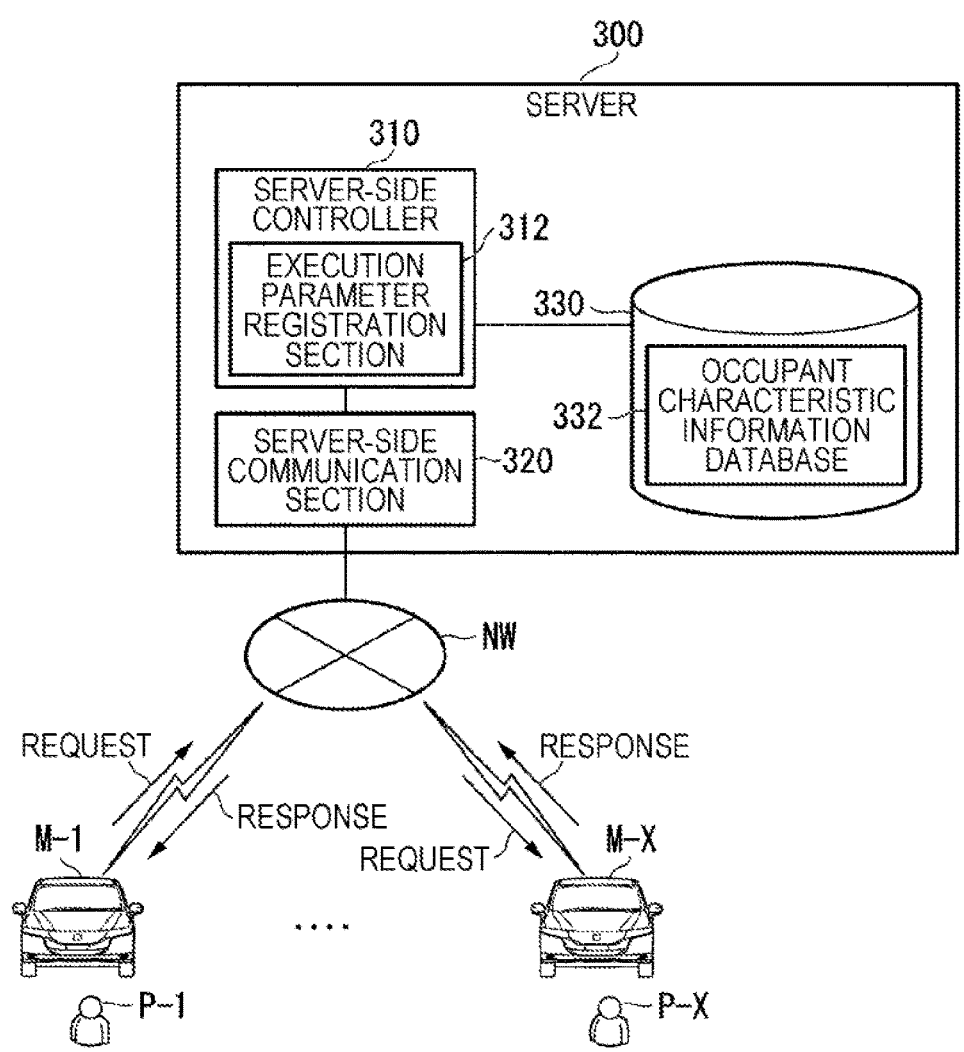
FIG. 12 is a diagram illustrating an example of a traffic control system configured by a vehicle installed with a vehicle control system, and a server.

Explanation follows regarding communication between the vehicle control system 100 described above and a server so as to make various automated driving settings. FIG. 12 is a diagram illustrating an example of a traffic control system configured by a vehicle installed with a vehicle control system 100 and the server 300.

The server 300, and the vehicle control system 100 installed to vehicles M-1 to M-X (where X is any natural number), exchange setting requests and responses through a network NW. The network NW includes, for example, a wireless base station, communication lines, the Internet, and the like.

Setting requests are transmitted from the vehicle control systems 100 in respective vehicles M to the server 300. The respective setting requests transmitted to the server 300 from vehicles M-1 to M-X include the user information of respective users P-1 to P-X read by user information reading devices 93. The server 300 manages the characteristic information of vehicle occupants based on user information and other information. The server 300 transmits the characteristic information of vehicle occupants corresponding to the user information included in the request as a response to the respective vehicle control systems 100 of the vehicles M. The characteristic information of a vehicle occupant includes, for example, information expressing execution parameters for automated driving executed by the automated driving controller 120.

The server 300, for example, includes a server-side controller 310, a server-side communication section 320, and a server-side storage section 330.

The server-side controller 310 is implemented by a processor such as a CPU executing a program. The server-side communication section 320 is a communication interface circuit, that executes communication processing. The server-side storage section 330 is implemented by ROM, RAM, a HDD, flash memory, or the like. An occupant, characteristic information database 332 is stored in the server-side storage section 330.

FIG. 13 is a table illustrating an example of the occupant characteristic information database 332. User information, such as a user ID (identification), server-side authentication information, a permitted automated driving mode, a permitted travel area, and other automated driving setting information, are associated with each other in the occupant characteristic information database 332. The permitted automated driving mode and permitted travel area are examples of automated driving execution parameters. Note that although the automated driving execution parameters may include the permitted automated driving mode and the permitted travel area, there is no limitation thereto. The automated driving execution parameters may include only the permitted automated driving mode. The other setting information while in automated driving includes display setting information to set items to display on the display device 82 during automated driving, such as whether the preferred travel mode of a vehicle occupant is a sports mode having excellent acceleration performance or an economy mode having excellent energy efficiency.

An execution parameter registration section 312 registers user information, and in correspondence with the user information, registers server-side authentication information, a permitted automated driving mode, a permitted travel area, and other automated driving setting information in the occupant characteristic information database 332. The execution parameter registration section 312 registers, for example, user information and various information associated with the user information, based, on a request transmitted by the vehicle control system 100 or a terminal device in the possession of a vehicle occupant. The execution parameter registration section 312 may also register various information associated with user information based on a driving history transmitted by the vehicle control system 100. The execution parameter registration section 312 may, for example, set the preferred mode of a vehicle occupant to a permitted automated driving mode based on the number of times the automated driving mode has been set by a vehicle occupant in a state in which the vehicle occupant is seated in the driving seat. Moreover, the execution parameter registration section 312, for example, may set the permitted travel area based on a travel route history when automated driving has been carried out in a state in which the vehicle occupant is seated in the driving seat. Moreover, the execution parameter registration section 312 may set whether the preferred travel mode of the vehicle occupant is a sports mode or an economy mode based on a speed change history when automated driving has been carried out in a state in which the vehicle occupant is seated in the driving seat. Moreover, the execution parameter registration section 312 may make settings based on a history of information relating to automated driving that, was displayed on the display device 82 when automated driving has been carried out in a state in which the vehicle occupant is seated in the driving seat. Information relating to automated driving is, for example, whether or not to display the set speed while automated driving, whether or not to display the lane of travel, and the like.

When requests including user information have been received from respective vehicle control systems 100 installed in plural vehicles M, the server-side controller 310 reads the automated driving execution parameters stored in correspondence with the user information included in the received requests. Using the server-side communication section 320, the server-side controller 310 replies to the vehicle control systems 100 that transmitted the settings requests with a response that includes the read automated driving execution parameters.

Figure 14:
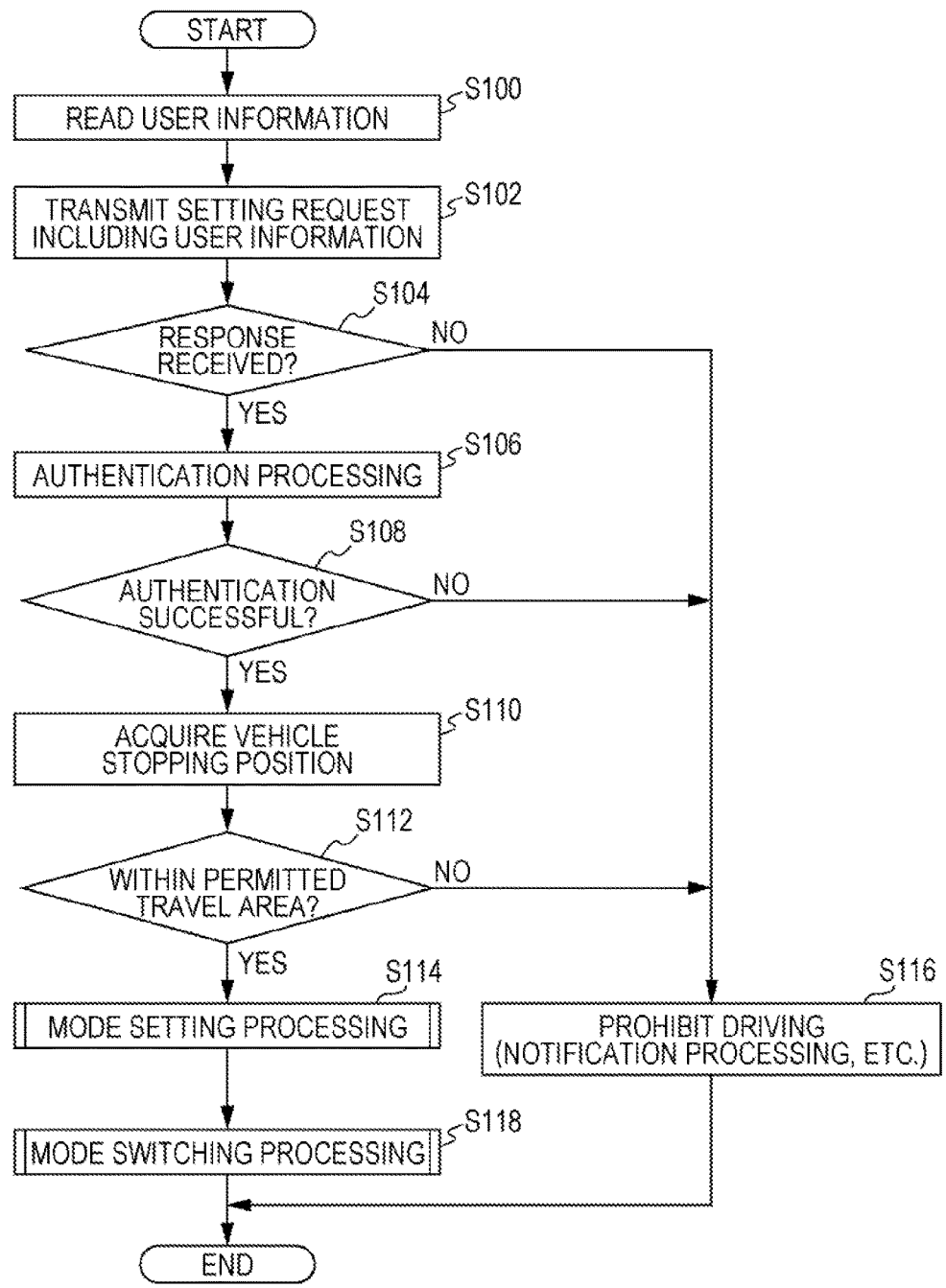
FIG. 14 is flowchart illustrating an example of a flow of processing to set automated driving execution parameters.

Explanation follows regarding an example of specific processing for setting automated driving execution parameters based on the user information of a vehicle occupant in the embodiment described above. FIG. 14 is a flowchart illustrating an example of a flow of processing to set automated driving execution parameters. Note that the processing of the flowchart illustrated in FIG. 14 is repeatedly executed while the vehicle M is starting.

First, the HMI controller 170 reads the user information of a vehicle occupant using the user information reading device 93 (step S100). Then, the HMI controller 170 transmits a setting request including the read user information to the server 300 using the communication device 55 (step S102).

When a setting request including user information has been received using the server-side communication section 320, the server-side controller 310 searches the occupant characteristic information database 332 using the received user information. When the received user information is registered in the occupant characteristic information database 332, the server-side controller 310 extracts server-side authentication information, automated driving execution parameters, the permitted travel area, and the like corresponding to the user information from the occupant characteristic information database 332. The server-side controller 310 replies to the vehicle control system 100 that transmitted the setting request using the server-side communication section 320 with a response that includes the extracted server-side authentication information, automated driving execution parameters, permitted travel area, and the like.

Next, the HMI controller 170 determines whether or not the response transmitted by the server 300 using the communication device 55 has been received (Step S104). The HMI controller 170 prohibits driving the vehicle M when, for example, a response was unable to be received even after a specific interval of time has passed (step S116). In such a case, the HMI controller 170 may perform notification processing to prohibit driving the vehicle M.

Next, the user authentication device 230 performs authentication processing based on the server-side authentication information transmitted by the server 300 (step S106). The HMI controller 170 compares the server-side authentication information transmitted by the server 300 and the information of the vehicle occupant to authenticate the vehicle occupant. When authorization information such as a name or permanent address recorded on a driving license or social security and tax number card has been received as server-side authentication information, the HMI controller 170 acquires the corresponding information using the user information reading device 93. The user authentication device 230 compares the authorization information and the information acquired using the user information reading device 93 to authenticate whether or not the vehicle occupant has the proper authorization. When a facial image has been received as server-side authentication information, the HMI controller 170 images the face of the vehicle occupant using the in-cabin camera 92. The user authentication device 230 compares the received, facial image and the imaged facial image to authenticate whether the vehicle occupant has the proper authorization. Note that although the user authentication device 230 may perform authentication based on the facial images themselves, there is no limitation thereto, and authentication may be performed based on a feature quantity of the facial images. A feature quantity of a facial image is, for example, edge image data obtained by performing edge extraction processing on the facial image. The user authentication device 230 may also perform authentication processing using both authorization information and a facial image, or may perform authentication processing using either one of these. Although the user authentication device 230 may perform facial authentication of a user, there is no limitation thereto, and authorization using biological information such as fingerprint information may be performed.

The user authentication device 230 determines whether or not authentication was successful (step S108). In cases in which authentication was successful, the user authentication device 230 permits the output of traction drive from the traction drive output device 200 to permit driving the vehicle M. In cases in which authentication has failed, the user authentication device 230 prohibits the output of traction drive from the traction drive output device 200 to prohibit driving the vehicle M (step S116).

In cases in which authentication was successful, the user authentication device 230 acquires a stopping position of the vehicle M identified by the navigation device 50 (step S110). Then, the user authentication device 230 determines whether or not the acquired stopping position of the vehicle M is within the permitted travel area included in the received response (step S112). In cases in which the stopping position of the vehicle M is not within the permitted travel area included in the received response, the user authentication device 230 prohibits the output of traction drive from the traction drive output device 200 to prohibit, driving the vehicle M (step S116).

In cases in which the stopping position of the vehicle M is within the permitted travel area, the automated driving mode controller 130 executes automated driving mode setting processing (step S114). Then, the automated driving mode controller 130 executes automated driving mode switching processing (step S118).

Figure 15:
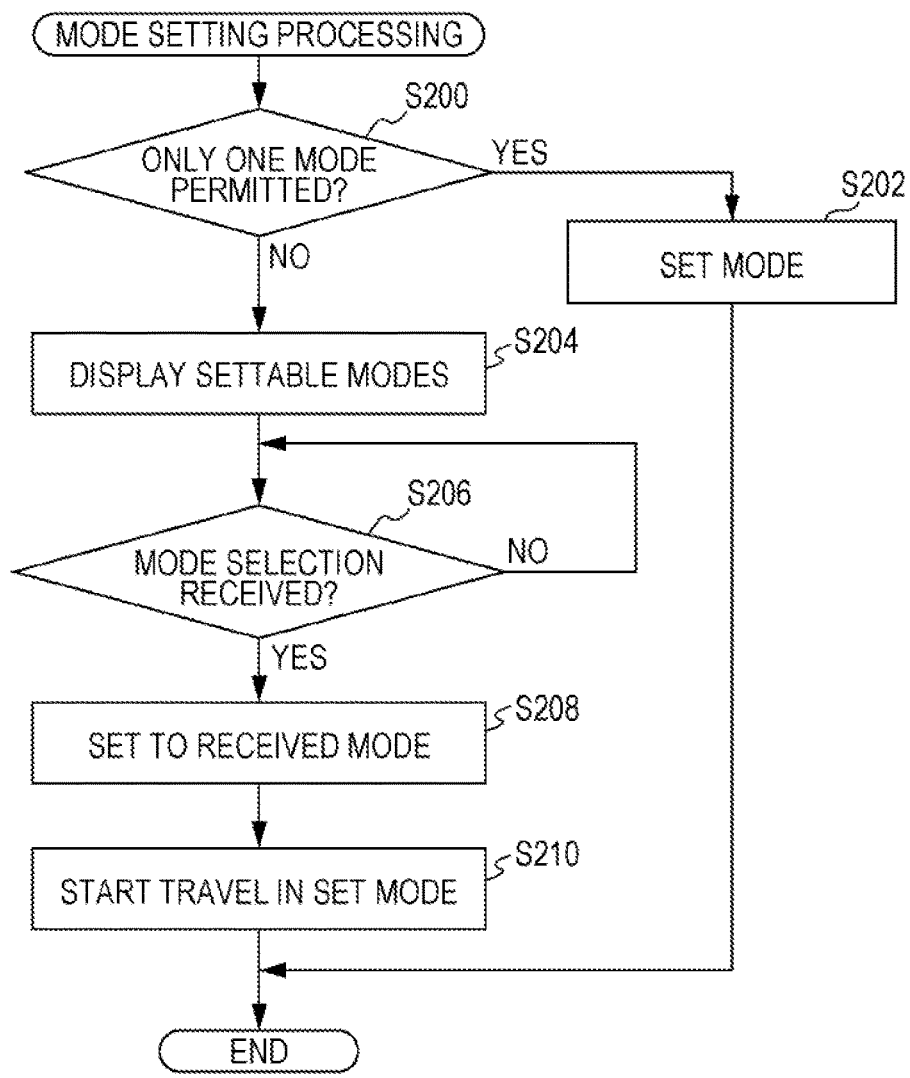
FIG. 15 is a flowchart illustrating an example of automated driving mode setting processing.

FIG. 15 is a flowchart illustrating an example of the automated driving mode setting processing of step S114 in FIG. 14. In this mode setting processing, the automated driving mode controller 130 acquires the permitted automated driving modes included in the response received from the server 300. The automated driving mode controller 130 determines whether or not only mode A is permitted in the permitted automated driving modes (step S200).

In cases in which only one mode is permitted, the automated driving mode controller 130 sets the automated driving mode to this one mode (step S202). The automated driving mode controller 130 sets the one mode and ends the processing of the flowchart.

In cases in which plural modes are permitted, the HMI controller 170 displays the plural modes included in the permitted automated driving modes as settable modes using the display device 82 (step S204). The HMI controller 170, for example, causes button images for the plural modes and a message image saying "Please select an automated driving mode" to be displayed. The HMI controller 170 also causes a message image saying "Automatically switch between plural modes?" or an OK button to be displayed. The HMI controller 170 thereby prompts the selection of an automated driving mode.

Next, the HMI controller 170 determines whether or not an operation selecting an automated driving mode has been received (step S206). In cases in which an operation selecting an automated driving mode has been received by the HMI controller 170, the automated driving mode controller 130 sets the automated driving mode to the received mode (step S208). Then, the automated driving mode controller 130 causes the automated driving controller 120 to execute automated driving in the set automated driving mode to begin travel of the vehicle M (step S210).

The HMI controller 170 is not limited to setting automated driving modes in the mode setting processing, and the HMI controller 170 may perform other automated driving settings such as the setting of a sports mode or economy mode stored in the occupant characteristic information database 332, or a display setting.

Figure 16:
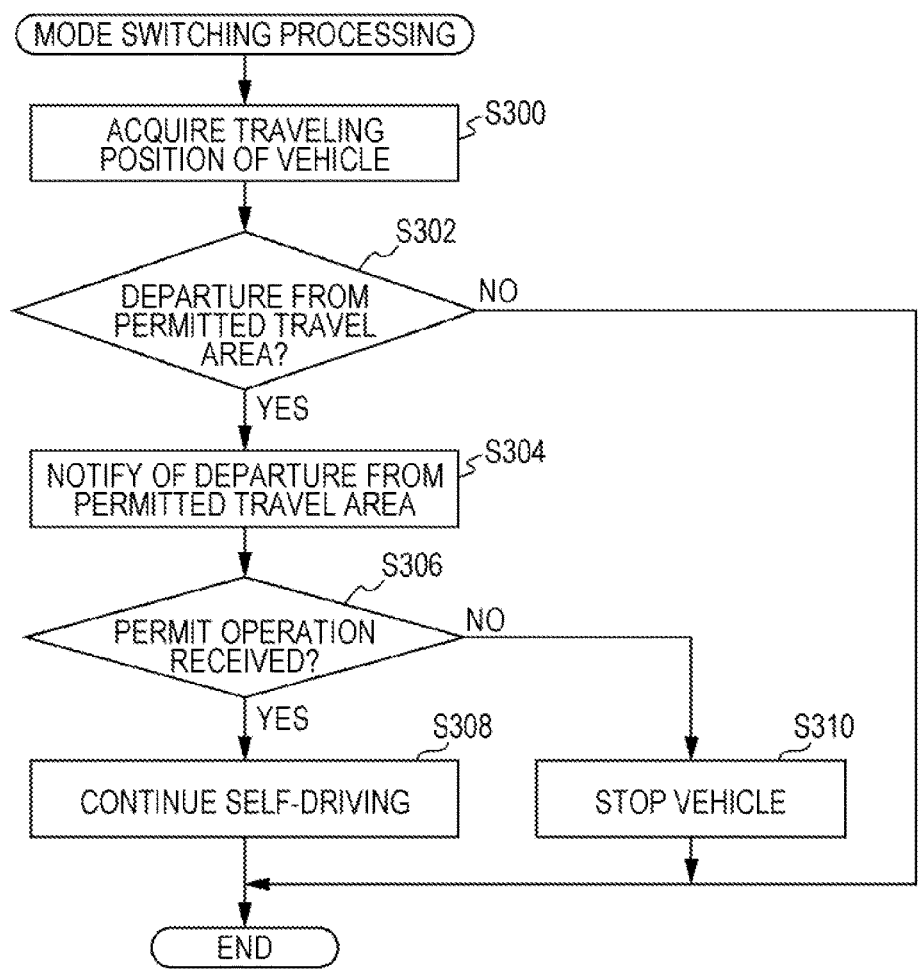
FIG. 16 is a flowchart illustrating an example of automated driving mode switching processing.

FIG. 16 is a flowchart illustrating an example of the automated driving mode switching processing at step S118 in FIG. 14. The processing of this flowchart is repeatedly executed after each specific interval of time while the vehicle M is traveling. The HMI controller 170 acquires the traveling position of the vehicle M identified by the navigation device 50 (step S300). Then, the HMI controller 170 determines whether or not the vehicle M will depart from the permitted travel area of the vehicle occupant based on the acquired traveling position (step S302). In a state in which the vehicle M is traveling along a recommended route set by the navigation device 50, when, for example, the distance until the vehicle M reaches the outside of the permitted travel area is a specific distance, the HMI controller 170 determines a departure from the permitted travel area of the vehicle occupant.

In cases in which it has been determined that the vehicle M will depart from the permitted travel area of the vehicle occupant, the HMI controller 170 gives a notification that the vehicle M will depart from the permitted travel area of the vehicle occupant (step S304). The HMI controller 170, for example, displays on the display device 82 a message image saying "Departing the automated driving travel area. Switch to manual driving?" or outputs audio from the speaker 83 saying "Departing the automated driving travel area. Switch to manual driving?"

Next, the HMI controller 170 determines whether or not an operation permitting the vehicle M to depart from the permitted travel area of the vehicle occupant has been received (step S306). The operation permitting departure preferably encompasses operations that can be verified to have been personally performed by the vehicle occupant, such as by password input, and fingerprint, iris, or voice authentication. In cases in which an operation permitting departure from the permitted travel area has been received, the HMI controller 170 continues the automated driving mode (step S308). In cases in which an operation permitting departure from the permitted travel area is not received, the HMI controller 170 stops the automated driving and stops the vehicle M (step S310).

Figure 17:
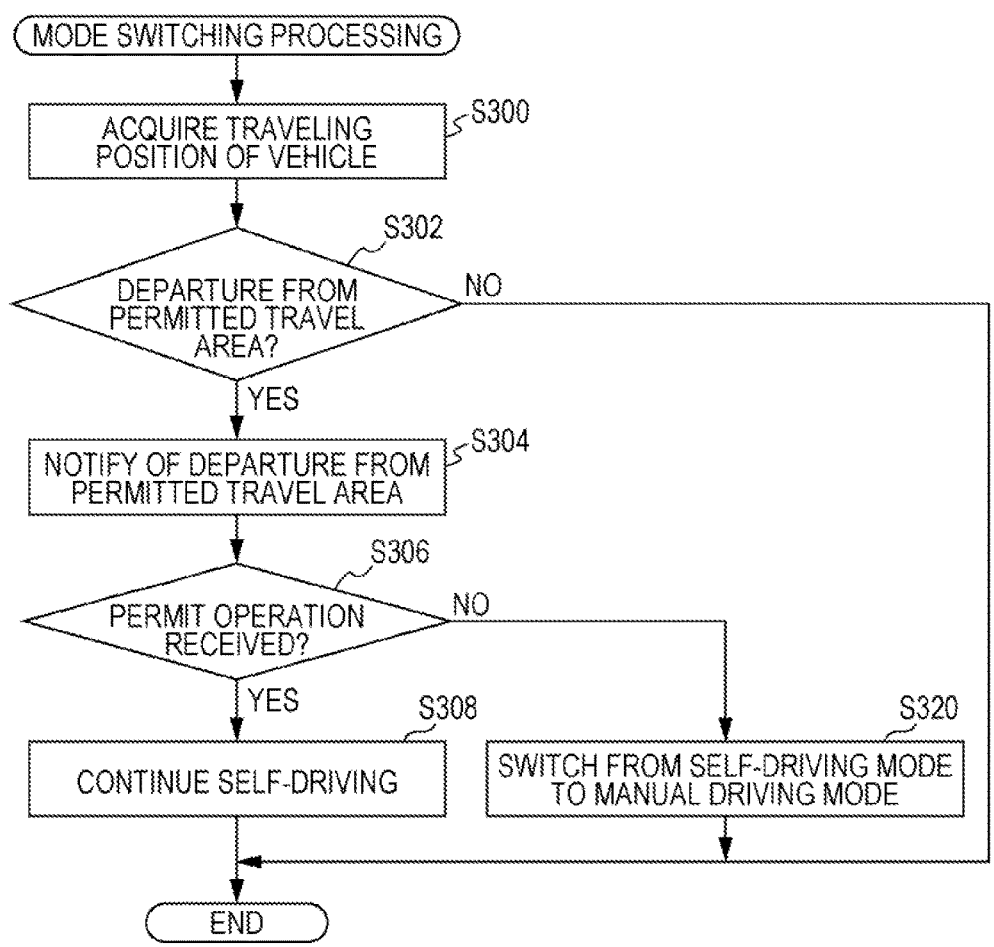
FIG. 17 is a flowchart illustrating another example of automated driving mode switching processing.

Although the HMI controller 170 may stop the vehicle M in cases in which an operation permitting departure from the permitted travel area is not received, there is no limitation thereto. As illustrated in FIG. 17, the HMI controller 170 may stop the execution of automated driving and switch to the manual driving mode in cases in which the permission of the vehicle occupant is not received (step S320). FIG. 17 is a flowchart illustrating another example of automated driving mode switching processing.

Note that in the permitted travel area, the area where the vehicle M is stopped, the area for stopping travel of the vehicle M in cases of departure from the permitted travel area as explained with reference to FIG. 16, and the area for switching from an automated driving mode to the manual driving mode in cases of departure from the permitted travel area as explained with reference to FIG. 17, may be different from each other. The area where the vehicle M is stopped may, for example, be a range of tens of meters or the like that includes a registered location of a user having the proper authorization. The area for stopping travel of the vehicle M may be a range for prohibiting travel in order to prevent theft of the vehicle M, for example, a range of tens of kilometers of the like within the living sphere of a user. The area for switching from an automated driving mode to the manual driving mode may, for example, be s set range in which a user may perform automated driving.

In cases in which an operation permitting departure from the permitted travel area is not received, the HMI controller 170 may continuously give notifications prompting permission of a switch from an automated driving mode to the manual driving mode. Then, when an operation permitting switching from the automated driving mode to the manual driving mode has been received, the HMI controller 170 switches from the automated driving mode to the manual driving mode. Additionally, the HMI controller 170 may give a notification prompting an operation to switch to any of the automated driving modes permitted for the vehicle occupant, and in cases in which an operation to switch the mode has been received, may switch the automated driving mode.

In the vehicle control system 100 and the traffic control system of the first embodiment explained above, user information is transmitted from the vehicle control system 100 to the server 300, and automated driving is controlled based on the characteristic information of a vehicle occupant that corresponds to the user information transmitted from the server 300 to the vehicle control system 100. Thus, in the first embodiment, for example, there is no need for a vehicle occupant to manually set a mode that executes automated driving suited to the vehicle occupant. As a result, in the first embodiment, automated, driving can be easily set for each vehicle occupant.

In the first embodiment, based on authorization information corresponding to user information transmitted from the server 300 to the vehicle control system 100, automated driving is executed in cases in which a vehicle occupant has the proper authorization, and driving the vehicle M is prohibited in cases in which the vehicle occupant does not have the proper authorization. Thus, in the first embodiment, the setting of the permission or prohibition of driving can be easily performed for each vehicle occupant. Additionally, in the first embodiment, automated driving of the vehicle M enables theft of the vehicle M to be suppressed.

Moreover, in the first embodiment, a facial image, or a feature quantity of the facial image, corresponding to user information transmitted from the server 300 to the vehicle control system 100 is compared with a facial image of a vehicle occupant imaged by the in-cabin camera 92, or a feature quantity of the facial image, enabling the permission or prohibition of driving to be easily set for each vehicle occupant. Additionally, in the first embodiment, automated driving of the vehicle M enables theft of the vehicle M to be suppressed.

Moreover, in the first embodiment, the permission or prohibition of driving can be easily set for each, vehicle occupant based on the permitted travel area corresponding to user information transmitted from the server 300 to the vehicle control system 100, and the stopping position of the vehicle M. Additionally, in the first, embodiment, automated driving of the vehicle M enables theft, of the vehicle M to be suppressed.

Furthermore, in the first embodiment, since automated driving is continued in cases in which an operation permitting the vehicle M to depart from the permitted travel area is received when the traveling position of the vehicle M will depart, from the permitted travel area of a vehicle occupant, the area to perform automated driving can be easily set for each vehicle occupant. Additionally, in the first embodiment, travel of the vehicle M to depart, from the permitted travel area can be prohibited. As a result, the vehicle control system 100 enables theft of the vehicle M to be suppressed.

Moreover, in the first embodiment, automated driving is executed within an automated driving mode range allowed for the vehicle occupant transmitted from the server 300 to the vehicle control system 100, and so a mode for performing automated driving can be easily set for each vehicle occupant.

Second Embodiment

Explanation follows regarding a vehicle control system, a traffic control system, a vehicle control method, and a vehicle control, program of a second embodiment. The second embodiment differs from the first embodiment in that automated driving proficiency level information of a vehicle occupant is registered in the server 300 as the characteristic information of the vehicle occupant to control automated driving. The following explanation focuses on these points.

FIG. 18 is a table illustrating an example of an occupant, characteristic information database 332A of the second embodiment. A user ID, server-side authentication information, and a proficiency level are associated in the occupant, characteristic information database 332A. Proficiency level is an example of an automated driving execution parameter.

The execution parameter registration section 312 of the second embodiment recognizes proficiency level information and stores the recognized proficiency level information in the server-side storage section 330. The execution parameter registration section 312 receives the user information and driving history information of the vehicle occupant from the vehicle M using the server-side communication section 320. The driving history information includes a driving history related to automated driving, such as the amount of time spent in automated driving and the number of times automated driving was used. The execution parameter registration section 312 recognizes the automated driving proficiency level of the vehicle occupant based on the driving history related to automated driving. The driving history related to automated driving is the cumulative time that the vehicle M has spent automated driving, and the number of times the vehicle M performed automated driving, in a state in which a vehicle occupant was seated in the driving seat. The execution parameter registration section 312 recognizes, for example, three proficiency levels, these being high, medium, and low.

The execution parameter registration section 312 sets the permitted automated driving mode based on the recognized proficiency level. The execution parameter registration section 312 expands the range of selectable modes from out of plural modes more the higher the proficiency level. The execution parameter registration section 312, for example, sets only mode A as a permitted automated driving mode for a vehicle occupant, with a low proficiency level. The execution parameter registration section 312 sets all automated driving modes, mode A, mode B, and mode C, as the permitted automated driving modes for a vehicle occupant with a high proficiency level. The execution parameter registration section 312 sets two automated driving modes out of mode A, mode B, and mode C as the permitted automated driving modes for a vehicle occupant with a medium proficiency level. The automated driving mode controller 130 thereby controls the automated driving mode in a range in which the range of selectable modes from out of plural modes is expanded more the higher the proficiency level.

Figure 19A:
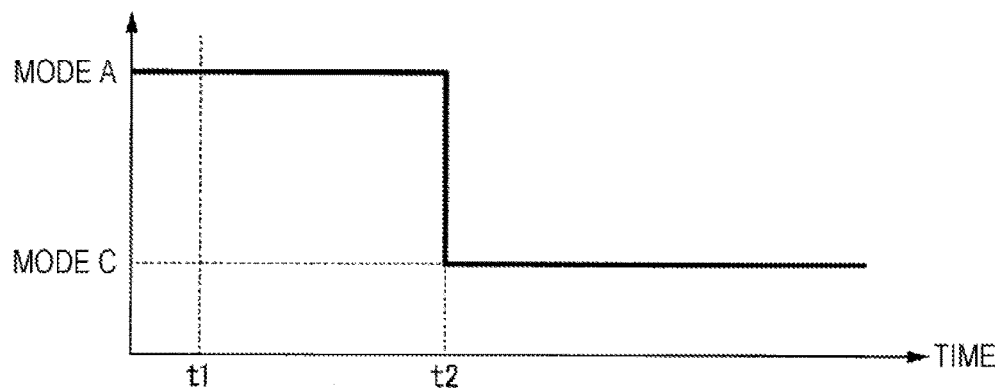
FIG. 19A to FIG. 19C are diagrams illustrating an example of changing an automated driving mode according to proficiency level.
Figure 19B:
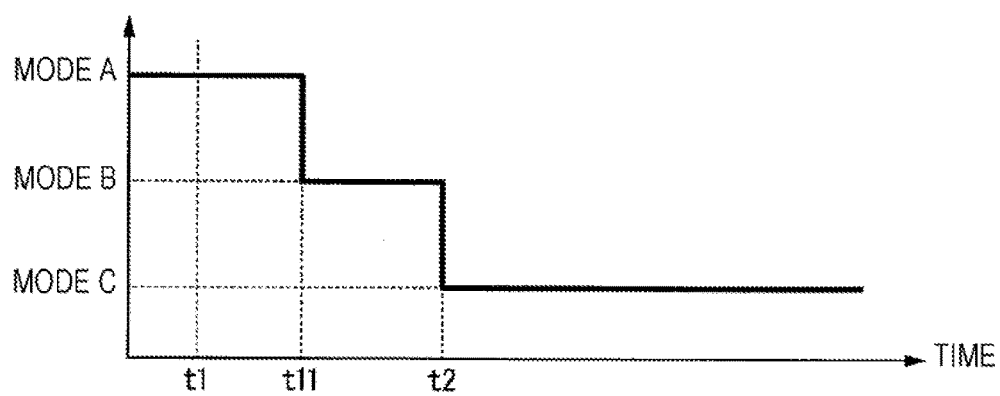
Figure 19C:
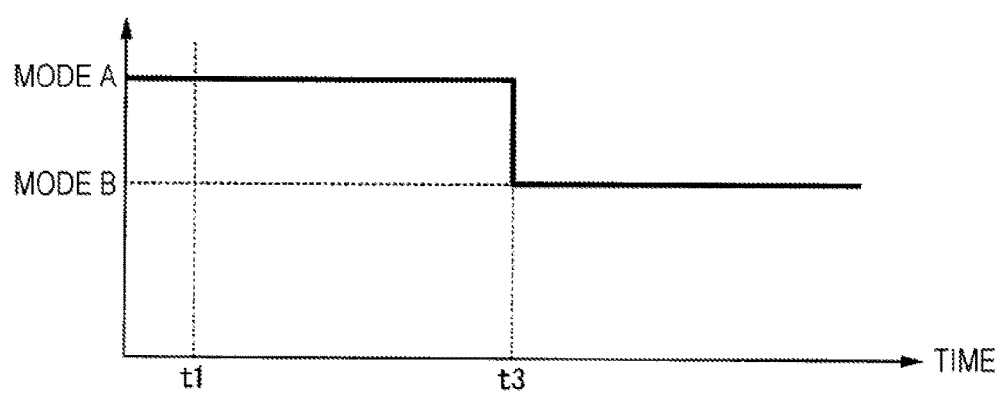

The execution parameter registration section 312 may also set, as an automated driving execution parameter, information to restrict the difference in the degree of automated driving before and after changing the automated driving mode more the lower the proficiency level. In cases in which the difference in the degree of automated driving is restricted, the execution parameter registration section 312 sets a sequential change in the modes of the permitted automated driving modes. FIG. 19A to FIG. 19C are diagrams illustrating an example of changing automated driving modes according to a level of proficiency.

Assume that the execution parameter registration section 312 sets the permitted automated driving modes as mode A, mode B, and mode C, corresponding to a high proficiency level. In such a case, as illustrated in FIG. 19A, when switching from mode A to mode C in the time period from time t1 to time t2, the automated driving mode controller 130 switches from mode A to mode C at time t2 without switching to mode B. In cases of a vehicle occupant with a high proficiency level the automated driving mode controller 130 thereby allows a two level mode change, from mode A to mode C, to be carried out by a single mode change.

Next, assume that the execution parameter registration section 312 sets the permitted automated driving modes as mode A, mode B, and mode C, corresponding to a medium proficiency level. In such a case, as illustrated in FIG. 19B, when switching from mode A to mode C in the time period from time t1 to time t2, the automated driving mode controller 130 first switches from mode A to mode B at time t11, and then switches from mode B to mode C at time t2. In cases of a vehicle occupant with a medium proficiency level the automated driving mode controller 130 thereby allows one level mode changes to be carried out by a single mode change.

Moreover, the execution parameter registration section 312 may lengthen the time required to change automated driving modes more the lower the proficiency level. Assume that the execution parameter registration section 312 sets the permitted automated driving modes as mode A and mode B, corresponding to a low proficiency level. In such a case, as illustrated in FIG. 19C, the automated driving mode controller 130 switches from mode A to mode B in the time period front times t1 to t3, which is longer than from times t1 to t2. In cases in which a vehicle occupant has a low proficiency level, the automated driving mode controller 130 thereby allows the time required for a single mode change to be longer than for a vehicle occupant having a high or medium proficiency level.

As described above, in the second embodiment, the switching of automated driving modes can be easily set based on the proficiency level of a vehicle occupant.

Although explanation has been given regarding modes for implementing the present disclosure with reference to exemplary embodiments, the present disclosure is not limited by these exemplary embodiments in any way, and various additional modifications and substitutions may be made within a range that does not depart from the spirit of the present disclosure.

What is claimed is:

1. A vehicle control system comprising:
   an automated driving controller configured to perform automated driving in which at least one out of speed control or steering control of a vehicle is performed automatically in a driving mode selected from a plurality of driving modes which require different degrees of automated driving; and
   a vehicle-side communication section configured to communicate with a server which stores and manages information associated with a vehicle occupant, the information including a proficiency level of the vehicle occupant for driving, the proficiency level being determined based on a driving history which includes a cumulative amount of time that the automated driving of the vehicle was performed or a number of times the automated driving of the vehicle was performed in a state in which the vehicle occupant was seated in a driving seat, wherein
   the automated driving controller is configured to control the automated driving based on the information associated with the vehicle occupant received from a server-side communication section of the server through the vehicle-side communication section, and
   the vehicle control system further comprises a mode controller configured to select the automated driving mode to be executed by the automated driving controller from a preset range of selectable modes and to expand the range of selectable modes more the higher the proficiency level received from the server-side communication section through the vehicle-side communication section.

2. The vehicle control system according to claim 1, wherein the information associated with the vehicle occupant includes authorization information relating to the driving of the occupant; and the vehicle control system further comprises
an authentication section that authenticates whether or not the vehicle occupant has proper authorization based on the authentication information received from the server-side communication section through the vehicle-side communication section, the authentication section permitting driving the vehicle in cases in which authentication is successful and prohibiting driving the vehicle in cases in which authentication has failed.

3. The vehicle control system according to claim 1, wherein
the information associated with the vehicle occupant comprises facial image information including a facial image of the vehicle occupant or a feature quantity in the facial image; and the vehicle control system further comprises
an imaging section configured to capture an image of an interior space in the vehicle, and
an authentication section configured to compare facial image information contained in the information associated with the vehicle occupant with corresponding facial image information of the occupant contained in the image captured by the imaging section to authenticate whether or not the vehicle occupant has proper authorization, the authentication section permitting driving the vehicle in cases in which authentication is successful and prohibiting driving the vehicle in cases in which authentication has failed.

4. The vehicle control system according to claim 1, wherein
the information associated with the vehicle occupant includes permitted travel area information for the vehicle occupant which indicates a permitted travel area in which the vehicle occupant is permitted to drive; and the vehicle control system further comprises
a position identifying section configured to identify a position of the vehicle, and
an authentication section configured to permit driving the vehicle in cases in which the position of the vehicle identified by the position identifying section is within the permitted travel area indicated by the permitted travel area information of the occupant received from the server-side communication section through the vehicle-side communication section, and to prohibit driving the vehicle in cases in which the position of the vehicle identified by the position identifying section is not within the permitted travel area indicated by the permitted travel area information of the occupant received from the server-side communication section through the vehicle-side communication section.

5. The vehicle control system according to claim 4, further comprising:
a notification section configured to, in cases in which the automated driving is being executed by the automated driving controller, give a notification that the position of the vehicle will depart from the permitted travel area when the position identified by the position identifying section departs from the permitted travel area; and an operation section configured to receive an operation permitting the vehicle to depart from the permitted travel area;
wherein the automated driving controller continues travel of the vehicle in cases in which the operation permitting the vehicle to depart from the permitted travel area has been received by the operation section, and stops the travel of the vehicle in cases in which an operation permitting the vehicle to depart from the permitted travel area is not received by the operation section.

6. The vehicle control system according to claim 4, further comprising:
a notification section configured to, in cases in which automated driving is being executed by the automated driving controller, give a notification that the position of the vehicle will depart from the permitted travel area when the position identified by the position identifying section departs from the permitted travel area; and
an operation section configured to receive an operation permitting the vehicle to depart from the permitted travel area;
wherein the automated driving controller continues travel of the vehicle in cases in which the operation permitting the vehicle to depart from the permitted travel area has been received by the operation section, and stops the execution of the automated driving in cases in which an operation permitting the vehicle to depart from the permitted travel area is not received by the operation section.

7. The vehicle control system according to claim 1, wherein
the plurality of automated driving modes include an automated driving-allowed mode,
the information associated with the vehicle occupant includes information indicating the automated driving-allowed mode for the vehicle occupant, and
the vehicle control system further comprises
a mode controller configured to select the automated driving mode to be executed by the automated driving controller, and to cause the automated driving controller to execute the automated driving within a range of the automated driving-allowed mode received from the server-side communication section through the vehicle-side communication section.

8. The vehicle control system according to claim 1, wherein
the mode controller restricts a difference in the degree of automated driving before and after changing the automated driving mode more the lower the proficiency level indicated by the proficiency level information received from the server-side communication section through the vehicle-side communication section.

9. The vehicle control system according to claim 8, wherein
the mode controller lengthens a time required to change the mode more the lower the proficiency level indicated by the proficiency level information received from the server-side communication section through the vehicle-side communication section.

10. A traffic control system comprising:
a vehicle control system configured to control a vehicle which has an vehicle occupant; and
a server which stores and manages information associated with the vehicle occupant, the information including a proficiency level of the vehicle occupant for driving, the proficiency level being determined based on a driving history which includes a cumulative amount of time that the automated driving of the vehicle was performed or a number of times the automated driving of the vehicle was performed in a state in which the vehicle occupant was seated in a driving seat, wherein the vehicle control system comprises:
- an automated driving controller configured to perform automated driving in which at least one out of speed control or steering control of the vehicle is performed automatically in a driving mode selected from a plurality of driving modes which require different degrees of automated driving; and
- a vehicle-side communication section configured to communicate with the server, and the automated driving controller is configured to control the automated driving based on the information associated with the vehicle occupant received from a server-side communication section of the server through the vehicle-side communication section, and the vehicle control system further comprises a mode controller configured to select the automated driving mode to be executed by the automated driving controller from a preset range of selectable modes and to expand the range of selectable modes more the higher the proficiency level received from the server-side communication section through the vehicle-side communication section.

11. A vehicle control method performed by an onboard computer of a vehicle, the method comprising:
- reading user information that identifies a vehicle occupant;
- transmitting a request including the read user information to a server for managing the user information;
- receiving information associated with the vehicle occupant from the server, which is stored in the server in a manner associated with the user information, the information associated with the vehicle occupant including a proficiency level of the vehicle occupant for driving, the proficiency level being determined based on a driving history which includes a cumulative amount of time that the automated driving of the vehicle was performed or a number of times the automated driving of the vehicle was performed in a state in which the vehicle occupant was seated in a driving seat; and
- controlling automated driving in which at least one out of speed control or steering control of the vehicle is performed automatically in a driving mode selected from a plurality of driving modes which require different degrees of automated driving, based on the information associated with the vehicle occupant received from the server, wherein the controlling of the automated driving further comprises allowing the vehicle occupant to select the automated driving mode from a preset range of selectable modes, while expanding the range of selectable modes more the higher the proficiency level received from the server.

12. A non-transitory computer readable media storing therein a vehicle control program executable by an onboard computer of a vehicle, comprising instructions to:
- read user information that identifies a vehicle occupant;
- transmit a request including the read user information to a server for managing the user information;
- receive information associated with the vehicle occupant from the server, which is stored in the server in a manner associated with the user information, the information associated with the vehicle occupant including a proficiency level of the vehicle occupant for driving, the proficiency level being determined based on a driving history which includes a cumulative amount of time that the automated driving of the vehicle was performed or a number of times the automated driving of the vehicle was performed in a state in which the vehicle occupant was seated in a driving seat; and
- control automated driving in which at least one out of speed control or steering control of the vehicle is performed automatically in a driving mode selected from a plurality of driving modes which require different degrees of automated driving, based on the information associated with the vehicle occupant received from the server, wherein the control of automated driving further comprises allowing the vehicle occupant to select the automated driving mode from a preset range of selectable modes, while expanding the range of selectable modes more the higher the proficiency level received from the server.

* * * * *